United States Patent
Qu

(10) Patent No.: US 12,184,481 B2
(45) Date of Patent: Dec. 31, 2024

(54) NETWORK CONFIGURATION INFORMATION CONFIGURATION METHOD AND DEVICE

(71) Applicant: Huawei Technologies Co., Ltd., Shenzhen (CN)

(72) Inventor: Jingwei Qu, Xi'an (CN)

(73) Assignee: HUAWEI TECHNOLOIGES CO., LTD., Shenzhen (CN)

( * ) Notice: Subject to any disclaimer, the term of this patent is extended or adjusted under 35 U.S.C. 154(b) by 318 days.

(21) Appl. No.: 17/639,425

(22) PCT Filed: Aug. 26, 2020

(86) PCT No.: PCT/CN2020/111470
§ 371 (c)(1),
(2) Date: Mar. 1, 2022

(87) PCT Pub. No.: WO2021/043045
PCT Pub. Date: Mar. 11, 2021

(65) Prior Publication Data
US 2022/0303180 A1    Sep. 22, 2022

(30) Foreign Application Priority Data
Sep. 2, 2019   (CN) .......................... 201910824319.9

(51) Int. Cl.
*H04L 41/082* (2022.01)
*H04L 41/0806* (2022.01)
(Continued)

(52) U.S. Cl.
CPC ........ *H04L 41/0806* (2013.01); *H04L 41/082* (2013.01); *H04L 41/0843* (2013.01);
(Continued)

(58) Field of Classification Search
CPC .............. H04L 41/0806; H04L 41/082; H04L 41/0843; H04L 41/0853; H04L 12/2807;
(Continued)

(56) References Cited

U.S. PATENT DOCUMENTS

2006/0209773 A1   9/2006  Hundal et al.
2014/0334473 A1  11/2014  Zhang et al.
(Continued)

FOREIGN PATENT DOCUMENTS

CA         2910090 A1    4/2016
CN       104349319 A    2/2015
(Continued)

OTHER PUBLICATIONS

D-Link, "User Manual D-Link DAP-1620 AC1200 Wi-Fi Range Extender," Sep. 8, 2015, XP055354577, 77 pages.

*Primary Examiner* — Hirdepal Singh
(74) *Attorney, Agent, or Firm* — Conley Rose, P.C.

(57) ABSTRACT

An electronic device accesses a first wireless network provided by a first wireless access device; and the electronic device sends network configuration information of a second wireless access device to the first wireless access device when the electronic device determines, based on the first wireless network and stored historical information, that the electronic device meets a preset condition, where the preset condition is used to indicate that the electronic device has changed from accessing the second wireless access device to accessing the first wireless access device, the network configuration information is used to configure the first wireless
(Continued)

access device, and the network configuration information includes a network name and a network password of a wireless network.

20 Claims, 11 Drawing Sheets

(51) Int. Cl.
*H04L 41/084* (2022.01)
*H04L 41/0853* (2022.01)
*H04W 4/02* (2018.01)
*H04W 8/24* (2009.01)
*H04W 48/16* (2009.01)

(52) U.S. Cl.
CPC ......... *H04L 41/0853* (2013.01); *H04W 4/025* (2013.01); *H04W 8/245* (2013.01); *H04W 48/16* (2013.01)

(58) Field of Classification Search
CPC .... H04L 41/0856; H04L 41/12; H04W 4/025; H04W 48/16; H04W 8/245; H04W 12/065
USPC .......................................................... 455/419
See application file for complete search history.

(56) References Cited

U.S. PATENT DOCUMENTS

| | | | |
|---|---|---|---|
| 2016/0191501 A1 | 6/2016 | Li et al. | |
| 2018/0035248 A1 | 2/2018 | Soave | |
| 2018/0206179 A1* | 7/2018 | Lin | ........................ H04W 48/12 |
| 2020/0084606 A1* | 3/2020 | Wang | ....................... H04W 4/50 |
| 2022/0077895 A1* | 3/2022 | Harney | .................... H01Q 7/00 |

FOREIGN PATENT DOCUMENTS

| | | | | |
|---|---|---|---|---|
| CN | 105392140 A | | 3/2016 | |
| CN | 105915416 A | | 8/2016 | |
| CN | 106656581 A | | 5/2017 | |
| CN | 107070707 A | | 8/2017 | |
| CN | 107645495 A | | 1/2018 | |
| CN | 108134695 A | | 6/2018 | |
| CN | 108259249 A | * | 7/2018 | ......... H04L 41/0803 |
| CN | 110138607 A | | 8/2019 | |
| CN | 110417582 A | | 11/2019 | |
| CN | 110730114 A | | 1/2020 | |
| FR | 2971072 A1 | | 8/2012 | |
| WO | 2017088101 A1 | | 6/2017 | |

* cited by examiner

NETWORK CONFIGURATION INFORMATION CONFIGURATION METHOD AND DEVICE

CROSS-REFERENCE TO RELATED APPLICATIONS

This is a U.S. National Stage of International Patent Application No. PCT/CN2020/111470 filed on Aug. 26, 2020, which claims priority to Chinese Patent Application No. 201910824319.9 filed on Sep. 2, 2019. Both of the aforementioned applications are hereby incorporated by reference in their entireties.

TECHNICAL FIELD

Embodiments of this application relate to the field of electronic technologies, and in particular, to a network configuration information configuration method and a device.

BACKGROUND

A wireless router can convert a signal such as a broadband network signal or a mobile network signal into a wireless signal by using an antenna, to form a wireless network. A wireless network device near the wireless router may access the wireless router, and access the wireless network provided by the wireless router, so as to perform Internet access and communication by using the wireless signal.

During replacement from an old wireless router to a new wireless router, a solution usually used in the conventional technology is that a user separately sets each wireless network device that accesses the old wireless router, so that the wireless network device separately accesses the new wireless router and a wireless network provided by the new wireless router. This solution requires the user to perform complex operations, resulting in poor user experience.

SUMMARY

Embodiments of this application provide a network configuration information configuration method and a device, so that user operations can be reduced and user experience can be improved when a wireless access device is replaced.

To achieve the foregoing objective, the following technical solutions are used in the embodiments of this application.

According to one aspect, a technical solution of this application provides a network configuration information configuration method, including: An electronic device accesses a first wireless network provided by a first wireless access device; and the electronic device sends network configuration information of a second wireless access device to the first wireless access device if the electronic device determines, based on the first wireless network and stored historical information, that the electronic device meets a preset condition, where the preset condition is used to indicate that the electronic device has changed from accessing the second wireless access device to accessing the first wireless access device, the network configuration information is used to configure the first wireless access device, and the network configuration information includes a network name and a network password of a wireless network.

In this solution, the electronic device may automatically determine, based on the stored historical information, that an accessed wireless access device is replaced. Therefore, the network configuration information of the second wireless access device used before the replacement may be sent to the second wireless access device used after the replacement. The first wireless access device may configure network configuration information of the first wireless access device to be consistent with the network configuration information of the second wireless access device used before the replacement. In this solution, a wireless network device that previously accesses, based on the network configuration information of the second wireless access device, a second wireless network provided by the second wireless access device can automatically access, based on the network configuration information of the second wireless access device, the first wireless network provided by the first wireless access device, so as to reduce complex operations of a user.

In a possible design, that the electronic device determines, based on the first wireless network and stored historical information, that the electronic device meets a preset condition includes: The electronic device obtains first location information if the electronic device determines that the electronic device does not previously access the first wireless network, where the first location information is used to indicate a current location of the electronic device; and the electronic device determines, based on the first location information and the historical information, that the electronic device meets the preset condition, where the preset condition includes that the first location information is the same as second location information in the historical information, or the preset condition includes that the first location information is the same as second location information in the historical information and a quantity of times of accessing a second wireless network corresponding to the second location information in the historical information is greater than or equal to a preset value, the second wireless network is a wireless network provided by the second wireless access device, and the first wireless network is different from the second wireless network.

In this solution, the electronic device may determine, based on the first location information and the historical information, whether a wireless access device is replaced. If the electronic device accesses or repeatedly accesses the second wireless network previously at the location indicated by the first location information and accesses the first wireless network at the same location this time, it may indicate that the wireless access device that provides a wireless network changes, and the second wireless access device is replaced with the first wireless access device.

In another possible design, the method further includes: If the electronic device determines, based on the first location information and the historical information, that the electronic device does not meet the preset condition, the electronic device stores a correspondence between the first location information and the first wireless network and records a quantity of times of accessing the first wireless network as 1.

In this way, the electronic device may subsequently determine, based on stored information, that the electronic device previously accesses the first wireless network.

In another possible design, the method further includes: The electronic device increases the quantity of access times corresponding to the first wireless network by 1 if the electronic device determines that the electronic device previously accesses the first wireless network.

In this solution, if the electronic device determines that the electronic device previously accesses the first wireless network, the electronic device may increase the quantity of access times, so that when subsequently accessing another wireless network, the electronic device may determine, based on the quantity of times, whether a wireless access device is changed.

In another possible design, the historical information includes a correspondence among a network name of a wireless network, access location information, identifier information of a wireless access device, and a quantity of access times.

In another possible design, the historical information includes a correspondence among a network name and a network password that are of a wireless network, and access location information.

In another possible design, the historical information includes a correspondence among a network name and a network password that are of a wireless network, access location information, and a quantity of access times.

In this way, the electronic device may determine, based on related content stored in the historical information, whether a wireless access device is replaced.

In another possible design, that the electronic device determines, based on the first wireless network and stored historical information, that the electronic device meets a preset condition includes: The electronic device scans first neighboring network information if the electronic device determines that the electronic device does not previously access the first wireless network, where the first neighboring network information is network information of a wireless network around the first wireless network; and the electronic device determines, based on the first neighboring network information and the historical information, that the electronic device meets the preset condition, where the preset condition includes that a similarity between the first neighboring network information and second neighboring network information of a second wireless network in the historical information is greater than or equal to a preset value, the second wireless network is a wireless network provided by the second wireless access device, the second neighboring network information is network information of a wireless network around the second wireless network, and the first wireless network is different from the second wireless network.

In this solution, the electronic device may determine, based on the first neighboring network information and the historical information, whether a wireless access device is replaced. If the first neighboring network information obtained through scanning after the first wireless network is accessed this time matches the second neighboring network information that is of the second wireless network and that is previously stored by the electronic device, it may indicate that neighboring network information basically does not change, and a geographical environment in which the electronic device is located may not change either, but an accessed wireless network changes. Therefore, the wireless access device that provides the wireless network may be replaced.

In another possible design, the method further includes: The electronic device stores a correspondence between the first neighboring network information and the first wireless network if the electronic device determines, based on the first neighboring network information and the historical information, that the electronic device does not meet the preset condition.

In this way, the electronic device may subsequently determine, based on stored information, that the electronic device previously accesses the first wireless network.

In another possible design, the first neighboring network information includes a network name that is of the wireless network around the first wireless network and that is obtained by the electronic device through scanning; or the first neighboring network information includes a network name and network signal strength that are of the wireless network around the first wireless network and that are obtained by the electronic device through scanning.

It may be understood that the first neighboring network information may be used to indicate a status of a wireless network around the electronic device when the electronic device accesses the first wireless network.

In another possible design, the historical information includes a correspondence among a network name of a wireless network, neighboring network information, and a quantity of access times.

In another possible design, the historical information includes a correspondence among a network name of a wireless network, neighboring network information, and location information.

In another possible design, the historical information includes a correspondence among a network name of a wireless network, neighboring network information, location information, and a quantity of access times.

In this way, the electronic device may determine, based on related content stored in the historical information, whether a wireless access device is replaced.

In another possible design, that the electronic device sends network configuration information of a second wireless access device to the first wireless access device includes: The electronic device prompts a user to enter management configuration information corresponding to the first wireless access device, where the management configuration information includes an administrator account and/or an administrator password; and the electronic device sends the network configuration information of the second wireless access device to the first wireless access device if the electronic device determines that the management configuration information entered by the user is correct.

In this solution, the electronic device may perform authentication on an identity of the user based on the management configuration information, and the electronic device may send the network configuration information only after authentication is performed on the identity of the user, so that the first wireless access device updates the network configuration information.

In another possible design, before the electronic device accesses the first wireless network, the method further includes: The electronic device accesses the second wireless network provided by the second wireless access device; and the electronic device obtains network management configuration information of the second wireless access device. That the electronic device determines that the management configuration information entered by the user is correct includes: If the management configuration information entered by the user is consistent with the network management configuration information of the second wireless access device that is obtained by the electronic device, the electronic device determines that the management configuration information entered by the user is correct.

In this way, the electronic device may obtain the network management configuration information of the second wireless access device when previously accessing the second wireless network, to perform authentication on the management configuration information entered by the user.

In another possible design, the network configuration information further includes at least one of the following: a data encryption manner, a media access control MAC address filtering rule, an access point (access point, AP)

isolation policy, a protected management frames (protected management frames, PMF) enabling status, or a service set identifier (service set identifier, SSID) configuration rule.

In this solution, user configurations, such as the data encryption manner, the MAC address filtering rule, the AP isolation policy, the PMF enabling status, or the SSID configuration rule, may be maintained consistent on the first wireless access device and the second wireless access device, so that the user can use the first wireless access device normally based on previous settings on the second wireless access device. This conforms to a usage habit of the user, and prevents the user from performing related configuration again.

In another possible design, the first wireless network and the second wireless network are Wi-Fi networks, and the first wireless access device and the second wireless access device are wireless routers.

In this way, the electronic device may update network configuration information of a wireless router that is used to provide a Wi-Fi network.

According to another aspect, an embodiment of this application provides a network configuration information configuration method, including: A wireless access device receives network configuration information of another wireless access device that is sent by an electronic device, where the network configuration information includes a network name and a network password of a wireless network; and the wireless access device configures network configuration information of the wireless access device to be consistent with the network configuration information of the another wireless access device.

In this solution, the wireless access device may configure, based on the network configuration information sent by the electronic device, the network configuration information of the wireless access device to be consistent with the network configuration information of the another wireless access device used before replacement. Therefore, in this solution, a wireless network device that previously accesses, based on the network configuration information of the another wireless access device, a second wireless network provided by the another wireless access device can automatically access, based on the network configuration information of the another wireless access device, a first wireless network provided by the wireless access device, so as to reduce complex operations of a user.

According to another aspect, an embodiment of this application provides an electronic device, including one or more processors and a memory. The memory stores code. When the code is executed by the electronic device, the electronic device is enabled to perform the following steps:

accessing a first wireless network provided by a first wireless access device; and sending network configuration information of a second wireless access device to the first wireless access device if determining, based on the first wireless network and stored historical information, that a preset condition is met, where the preset condition is used to indicate that the electronic device has changed from accessing the second wireless access device to accessing the first wireless access device, the network configuration information is used to configure the first wireless access device, and the network configuration information includes a network name and a network password of a wireless network.

In a possible design, the determining, based on the first wireless network and stored historical information, that a preset condition is met specifically includes: obtaining first location information if determining that the electronic device does not previously access the first wireless network, where the first location information is used to indicate a current location of the electronic device; and determining, based on the first location information and the historical information, that the preset condition is met, where the preset condition includes that the first location information is the same as second location information in the historical information, or the preset condition includes that the first location information is the same as second location information in the historical information and a quantity of times of accessing a second wireless network corresponding to the second location information in the historical information is greater than or equal to a preset value, the second wireless network is a wireless network provided by the second wireless access device, and the first wireless network is different from the second wireless network.

In another possible design, when the code is executed by the electronic device, the electronic device is further enabled to perform the following steps: if determining, based on the first location information and the historical information, that the preset condition is not met, storing a correspondence between the first location information and the first wireless network and recording a quantity of times of accessing the first wireless network as 1.

In another possible design, when the code is executed by the electronic device, the electronic device is further enabled to perform the following step: increasing the quantity of access times corresponding to the first wireless network by 1 if determining that the electronic device previously accesses the first wireless network.

In another possible design, the determining, based on the first wireless network and stored historical information, that a preset condition is met specifically includes: scanning first neighboring network information if determining that the electronic device does not previously access the first wireless network, where the first neighboring network information is network information of a wireless network around the first wireless network; and determining, based on the first neighboring network information and the historical information, that the preset condition is met, where the preset condition includes that a similarity between the first neighboring network information and second neighboring network information of a second wireless network in the historical information is greater than or equal to a preset value, the second wireless network is a wireless network provided by the second wireless access device, the second neighboring network information is network information of a wireless network around the second wireless network, and the first wireless network is different from the second wireless network.

In another possible design, when the code is executed by the electronic device, the electronic device is further enabled to perform the following step: storing a correspondence between the first neighboring network information and the first wireless network if determining, based on the first neighboring network information and the historical information, that the preset condition is not met.

In another possible design, the first neighboring network information includes a network name that is of the wireless network around the first wireless network and that is obtained by the electronic device through scanning, or the first neighboring network information includes a network name and network signal strength that are of the wireless network around the first wireless network and that are obtained by the electronic device through scanning.

In another possible design, the sending network configuration information of a second wireless access device to the first wireless access device specifically includes: prompting a user to enter management configuration information corresponding to the first wireless access device, where the management configuration information includes an administrator account and/or an administrator password; and sending the network configuration information of the second wireless access device to the first wireless access device if determining that the management configuration information entered by the user is correct.

In another possible design, when the code is executed by the electronic device, the electronic device is further enabled to perform the following steps: accessing the second wireless network before accessing the first wireless network; and obtaining network management configuration information of the second wireless access device, where the second wireless network is a wireless network provided by the second wireless access device. The determining that the management configuration information entered by the user is correct specifically includes: if the management configuration information entered by the user is consistent with the network management configuration information of the second wireless access device that is obtained by the electronic device, determining that the management configuration information entered by the user is correct.

According to another aspect, an embodiment of this application provides a wireless access device, including one or more processors and a memory. The memory stores code. When the code is executed by an electronic device, the electronic device is enabled to perform the following steps: receiving network configuration information of another wireless access device that is sent by an electronic device, where the network configuration information includes a network name and a network password of a wireless network; and configuring, by the wireless access device, network configuration information of the wireless access device to be consistent with the network configuration information of the another wireless access device.

According to another aspect, an embodiment of this application provides an information configuration apparatus. The apparatus is included in an electronic device or a first wireless access device. The apparatus has functions of implementing behavior of the electronic device in any method according to the foregoing aspects and the possible designs. The functions may be implemented by using hardware, or may be implemented by hardware executing corresponding software. The hardware or the software includes at least one module or unit corresponding to the functions, for example, an access module/unit, a determining module/unit, a sending module/unit, an obtaining module/unit, and a storage module/unit.

According to another aspect, an embodiment of this application provides a computer storage medium, including computer instructions. When the computer instructions are run on an electronic device, the electronic device is enabled to perform the network configuration information configuration method in any possible design of the foregoing aspects.

According to another aspect, an embodiment of this application provides a computer storage medium, including computer instructions. When the computer instructions are run on a wireless access device, the wireless access device is enabled to perform the network configuration information configuration method in any possible design of the foregoing aspects.

According to another aspect, an embodiment of this application provides a computer program product. When the computer program product runs on a computer, the computer is enabled to perform the network configuration information configuration method in any possible design of the foregoing aspects.

According to another aspect, an embodiment of this application provides a chip system. The chip system is applied to an electronic device. The chip system includes one or more interface circuits and one or more processors. The interface circuit and the processor are interconnected by using a line. The interface circuit is configured to receive a signal from a memory of the electronic device, and send the signal to the processor, where the signal includes computer instructions stored in the memory. When the processor executes the computer instructions, the electronic device performs the network configuration information configuration method in any possible design of the foregoing aspects.

According to another aspect, an embodiment of this application provides a communications system, including an electronic device, a first wireless access device, and at least one wireless network device. The electronic device and the first wireless access device may perform the network configuration information configuration method in any possible design of the foregoing aspects. The wireless network device may automatically access, based on network configuration information of a second wireless access device, a first wireless network provided by the first wireless access device.

For beneficial effects corresponding to the foregoing other aspects, refer to the descriptions of the beneficial effects in the method aspects. Details are not described herein again.

BRIEF DESCRIPTION OF DRAWINGS

FIG. 4A-1 to FIG. 4A-3 are a flowchart of a network configuration information configuration method according to an embodiment of this application;

DESCRIPTION OF EMBODIMENTS

Figure 1:
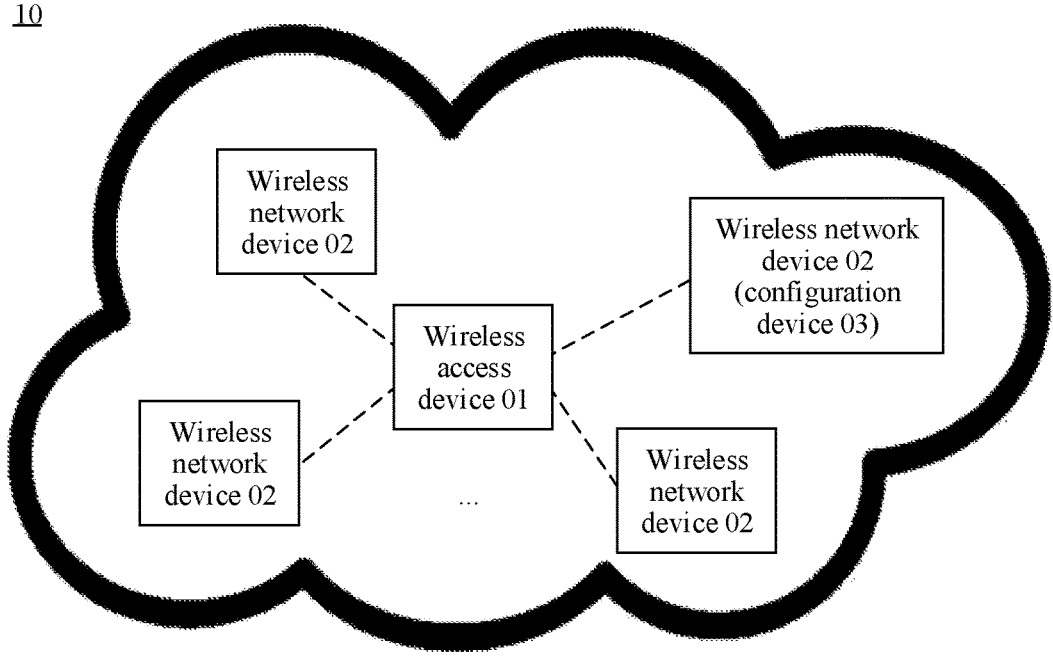
FIG. 1 is a schematic diagram of a wireless system according to an embodiment of this application.

The following describes technical solutions in embodiments of this application with reference to the accompanying drawings in the embodiments of this application. In the descriptions of the embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists.

In addition, in the descriptions of the embodiments of this application, "a plurality of" means two or more.

In the conventional technology, when a wireless access device such as a wireless router is replaced, a user needs to separately set each wireless network device that accesses an old wireless access device, so that each wireless network device separately accesses a new wireless access device and a wireless network provided by the new wireless access device. Therefore, user operations are complex, and user experience is poor.

After the wireless access device is replaced, if network configuration information of the new wireless access device is consistent with network configuration information of the old wireless access device, the wireless network device that previously accesses the old wireless access device may automatically access the new wireless access device and the wireless network provided by the new wireless access device. The network configuration information may include a network name and a network password of the wireless network. The network name of the wireless network may be an SSID of a wireless module in the wireless access device.

Therefore, in some existing implementations, a user may set network configuration information of a new wireless access device to be consistent with network configuration information of an old wireless access device. In these implementations, the user does not need to separately set each wireless network device that accesses the old wireless access device, so as to reduce user operations.

However, many users do not know that if the network configuration information of the new wireless access device is set to be consistent with the network configuration information of the old wireless access device, the wireless network device that previously accesses the old wireless access device can automatically access the new wireless access device. Alternatively, some users know that the network configuration information of the new wireless access device may be set to be consistent with the network configuration information of the old wireless access device, but do not know or forget related information such as a network password of the old wireless access device, causing a failure of such setting. In addition, an existing method for setting a new wireless access device is relatively troublesome, causing poor user experience.

In some other existing implementations, if a wireless network is a Wi-Fi network, a user may separately enable Wi-Fi protected setup (Wi-Fi protected setup, WPS) copy (copy) functions of a new wireless access device and an old wireless access device. WPS protocol interaction is performed between the new wireless access device and the old wireless access device. In the interaction process, the new wireless access device may obtain Wi-Fi configuration information of the old wireless access device, and copy the Wi-Fi configuration information of the old wireless access device to a Wi-Fi configuration of the new wireless access device. Therefore, the new wireless access device may set a network name and network password of a provided Wi-Fi network to be consistent with a network name and network password of the old wireless access device. In these implementations, a function of the old wireless access device needs to be normal. If the old wireless access device is damaged, this method cannot be used. In these implementations, both the new wireless access device and the old wireless access device are required to support the WPS function. In addition, in these implementations, the user needs to operate two wireless access devices, resulting in a high operation requirement and complex operations. Therefore, these implementations are not easy for the user to use.

An embodiment of this application provides a network configuration information configuration method, which may be applied to a wireless system 10 shown in FIG. 1. The wireless system includes a wireless access device 01 and a plurality of wireless network devices 02. The wireless access device 01 includes a wireless module, and the wireless module may radiate a wireless signal to a surrounding area, so as to form a wireless network. The plurality of wireless network devices 02 may access the wireless access device 01 and the wireless network provided by the wireless access device 01. The plurality of wireless network devices 02 include a configuration device 03.

The configuration device may automatically recognize that the wireless access device is replaced, and automatically send network configuration information of an old wireless access device to a new wireless access device, so that the new wireless access device sets network configuration information of the new wireless access device to be consistent with the network configuration information of the old wireless access device. In this way, configuration information of the wireless network can be automatically copied and set without a manual operation of the user when the wireless access device is replaced, so that a plurality of other wireless network devices automatically access a wireless network provided by the new wireless access device. Therefore, user experience is relatively good. In addition, the method does not require that a function of the old wireless access device is normal, and not require that both the new wireless access device and the old wireless access device support a WPS function.

For example, the wireless network may be a wireless communications network based on a wireless communications technology such as wireless fidelity (wireless fidelity, Wi-Fi), Bluetooth (bluetooth, BT), near field communication (near field communication, NFC), infrared (infrared, IR), Zigbee (ZigBee), frequency modulation (frequency modulation, FM), or a global navigation satellite system (global navigation satellite system, GNSS). It may be understood that the wireless network may alternatively be another wireless communications network that is not listed in the embodiments of this application. A specific type of the wireless network is not limited in the embodiments of this application.

The wireless access device can convert a signal such as a broadband network signal or a mobile network signal into a wireless signal by using an antenna, to form a wireless network. The wireless access device may further provide the wireless network, and help the wireless network device access the wireless network. For example, the wireless access device may be a wireless access point, a wireless router, or another electronic device with a wireless access function. In the embodiments of this application, that a wireless network device accesses a wireless access device means that the wireless network device accesses a wireless network provided by the wireless access device, and that a wireless access device accesses a wireless network means that the wireless access device accesses a wireless access device configuring the wireless network.

The wireless network device may be a mobile phone, a tablet computer, a notebook computer, a smart home device, an ultra-mobile personal computer (ultra-mobile personal computer, UMPC), a personal digital assistant (personal digital assistant, PDA), a wearable device, an augmented reality (augmented reality, AR)/virtual reality (virtual reality, VR) device, or the like.

The configuration device may be an electronic device that has a network configuration information configuration function provided in the embodiments of this application in the wireless network devices. For example, the configuration device may be a mobile phone, a tablet computer, or the like.

Figure 2:
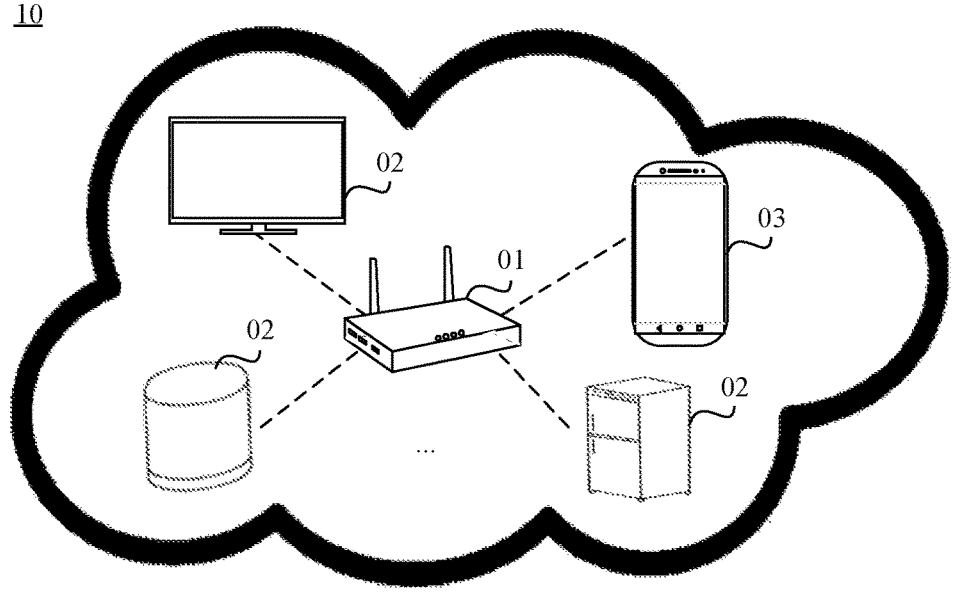
FIG. 2 is a schematic diagram of a wireless system in a smart home scenario according to an embodiment of this application.

In an example, as shown in FIG. 2, the wireless system 10 is a smart home system, the wireless network is a Wi-Fi network, and the wireless access device 01 is a wireless router. The wireless router includes a Wi-Fi module, and the Wi-Fi module may radiate a wireless signal to a surrounding area to form a Wi-Fi network. The wireless network devices 02 may include electronic devices such as a mobile phone and a smart home device. The configuration device 03 may be a mobile phone. The smart home device may include an electronic device such as a television, a refrigerator, a smart speaker, an air conditioner, a smart lamp, a curtain, or a smart lock. As a configuration device, the mobile phone can automatically recognize that the wireless router is replaced, and automatically set network configuration information of a new wireless router to be consistent with network configuration information of an old wireless router. Therefore, a plurality of smart home devices may automatically access, based on the network configuration information of the old wireless router, a wireless network provided by the new wireless router used after the replacement.

Figure 3:
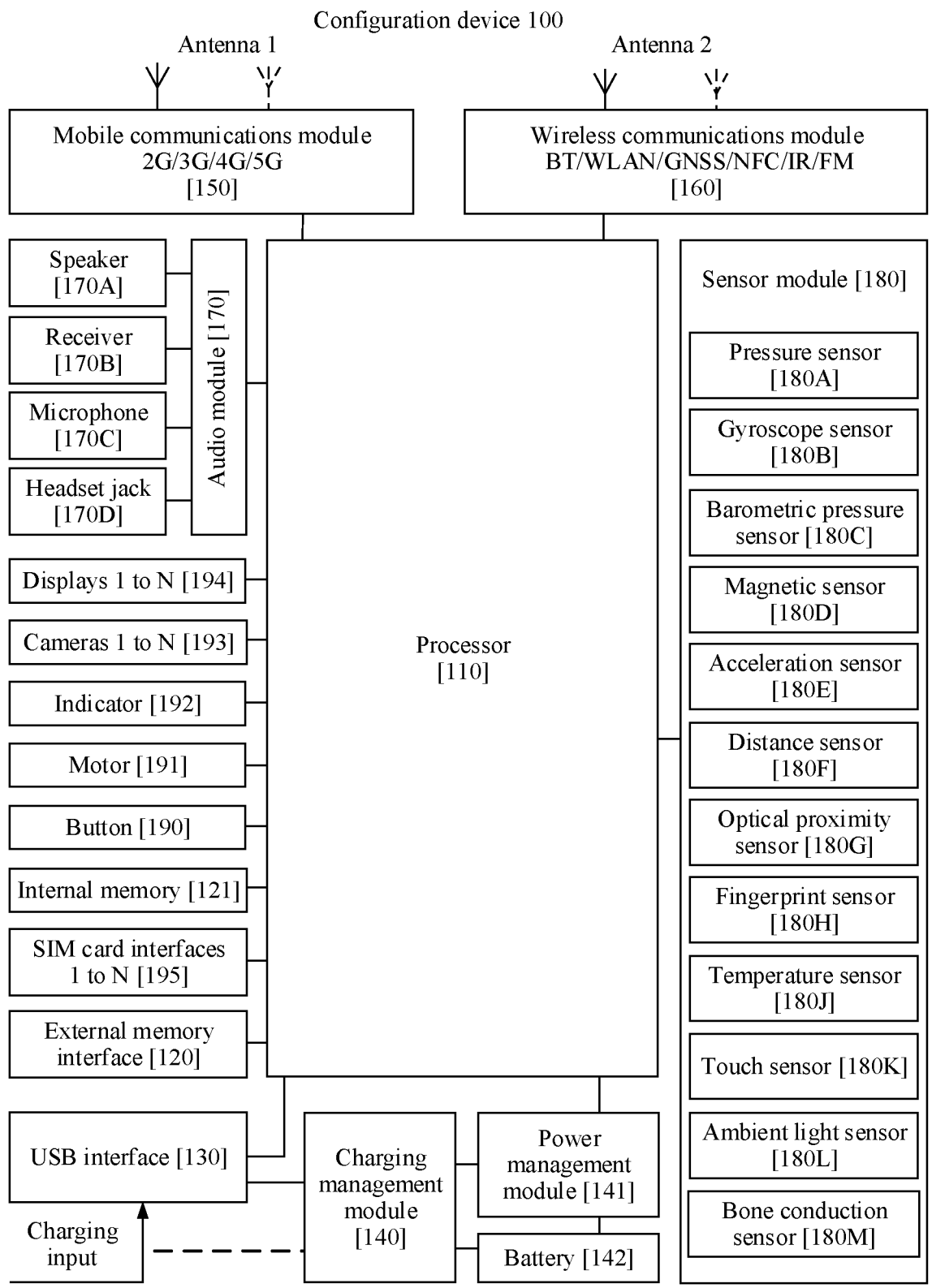
FIG. 3 is a schematic diagram of a structure of an electronic device according to an embodiment of this application.

For example, FIG. 3 is a schematic diagram of a structure of a configuration device 100. The configuration device 100 may be a configuration device, or may be a wireless device. The configuration device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the configuration device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the configuration device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and encode an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the configuration device 100. The processor 110 communicates with the display 194 through the DSI, to implement a display function of the configuration device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the configuration device 100, or may be configured to transmit data between the configuration device 100 and a peripheral device, or may be configured to connect to a headset to play audio by using the headset. Alternatively, the interface may be configured to connect to another electronic device such as an AR device.

It may be understood that an interface connection relationship between the modules illustrated in some embodiments of this application is merely an example for description, and does not constitute a limitation on the structure of the configuration device 100. In some other embodiments of this application, the configuration device 100 may alternatively use an interface connection manner different from that in the foregoing embodiments, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the configuration device 100. The charging management module 140 may further supply power to the configuration device by using the power management module 141 when charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the configuration device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the configuration device 100 may be configured to cover one or more communication frequency bands. Different antennas may be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the configuration device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that is applied to the configuration device 100 and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

The wireless communications module 160 may scan and access a wireless network. The wireless communications module 160 may obtain a network name of an accessed wireless network, and network information (for example, a network name or signal strength) of a wireless network around the configuration device 100.

The mobile communications module 150 or the wireless communications module 160 may be further configured to perform positioning, to determine geographical location information when the configuration device 100 accesses the wireless network. For example, GPS positioning, base station positioning, or indoor positioning such as Wi-Fi positioning or Bluetooth positioning may be performed.

In some embodiments, in the configuration device 100, the antenna 1 and the mobile communications module 150 are coupled, and the antenna 2 and the wireless communications module 160 are coupled, so that the configuration device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The configuration device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the configuration device 100 may include one or N displays 194, where N is a positive integer greater than 1.

The configuration device 100 may implement a photographing function by using the ISP, the camera 193, the video codec, the GPU, the display 194, the application processor, and the like.

The ISP is configured to process data fed back by the camera 193. For example, during photographing, a shutter is opened, and light is transmitted to a photosensitive element of the camera through a lens. The photosensitive element of the camera converts an optical signal into an electrical signal, and transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the configuration device 100 may include one or N cameras 193, where N is a positive integer greater than 1.

The digital signal processor is configured to process a digital signal, and may process another digital signal in addition to a digital image signal. For example, when the configuration device 100 selects a frequency, the digital signal processor is configured to perform Fourier transform and the like on frequency energy.

The video codec is configured to compress or decompress a digital video. The configuration device 100 may support one or more types of video codecs. Therefore, the configuration device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the configuration device 100, such as image recognition, facial recognition, speech recognition, and text understanding.

The external memory interface 120 may be configured to connect to an external storage card, for example, a micro SD card, to extend a storage capability of the configuration device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications and data processing of the configuration device 100. The internal memory 121 may include a program storage area and a data storage area. The program storage area may store an operating system, an application required by at least one function (for example, a sound playing function or an image playing function), and the like. The data storage area may store data (for example, audio data and a phone book) and the like that are created during use of the configuration device 100. In addition, the internal memory 121 may include a high-speed random access memory, and may further include a non-volatile memory, for example, at least one magnetic disk storage device, a flash memory device, or a universal flash storage (universal flash storage, UFS).

In some embodiments of this application, the internal memory 121 stores a correspondence between a network name of a wireless network accessed by the configuration device 100 and a geographical location, or stores network information that is of a surrounding wireless network and that is obtained by the configuration device 100 through scanning after the configuration device 100 accesses the wireless network.

The processor 110 may determine, based on the correspondence between a network name of an accessed wireless network and a geographical location, or based on the network information that is of the surrounding wireless network and that is obtained by the configuration device 100 through scanning after the configuration device 100 accesses the wireless network, that a wireless access device is replaced. Then, the processor 110 may configure network configuration information of an old wireless access device for a new wireless access device, so that a wireless network device that previously accesses the old wireless access device may automatically access the new wireless access device based on the network configuration information of the old wireless access device.

The configuration device 100 may implement audio functions by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal for output, and is also configured to convert an analog audio input into a digital audio signal. The audio module 170 may be further configured to encode and decode audio signals. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The configuration device 100 may be used to listen to music or answer a handsfree call over the speaker 170A.

The receiver 170B, also referred to as an "earpiece", is configured to convert an audio electrical signal into a sound signal. When a call is answered or voice information is listened to by using the configuration device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound close to the microphone 170C through the mouth of the user, to input a sound signal to the microphone 170C. At least one microphone 170C may be disposed in the configuration device 100. In some other embodiments, two microphones 170C may be disposed in the configuration device 100, to collect a sound signal and implement a noise reduction function. In some other embodiments, three, four, or more microphones 170C may alternatively be disposed in the configuration device 100, to collect a sound signal, reduce noise, and recognize a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The configuration device 100 determines pressure intensity based on a capacitance change. When a touch operation is performed on the display 194, the configuration device 100 detects intensity of the touch operation by using the pressure sensor 180A. The configuration device 100 may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyroscope sensor 180B may be configured to determine a motion posture of the configuration device 100. In some embodiments, angular velocities of the configuration device 100 around three axes (that is, axes x, y, and z) may be determined by using the gyroscope sensor 180B. The gyroscope sensor 180B may be used for image stabilization during photographing. For example, when a shutter is opened, the gyroscope sensor 180B detects an angle at which the configuration device 100 jitters, obtains, through calculation based on the angle, a distance for which a lens module needs to compensate, and enables the lens to counteract the jitter of the configuration device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the configuration device 100 calculates an altitude based on a barometric pressure value measured by the barometric pressure sensor 180C, to assist in positioning and navigation.

The magnetic sensor 180D includes a Hall effect sensor. The configuration device 100 may detect opening and closing of a flip cover by using the magnetic sensor 180D. In some embodiments, when the configuration device 100 is a clamshell phone, the configuration device 100 may detect opening and closing of a flip cover by using the magnetic sensor 180D. Further, a feature such as automatic unlocking upon opening of the flip cover is set based on a detected opening or closing state of the flip cover.

The acceleration sensor 180E may detect magnitudes of accelerations of the configuration device 100 in various directions (usually on three axes), and may detect a magnitude and a direction of gravity when the configuration device 100 is still. The acceleration sensor 180E may be further configured to recognize a posture of an electronic device, and is applied to an application such as switching between a landscape mode and a portrait mode or a pedometer.

The distance sensor 180F is configured to measure a distance. The configuration device 100 may measure a distance in an infrared manner or a laser manner. In some embodiments, in a photographing scenario, the configuration device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The configuration device 100 emits infrared light by using the light-emitting diode. The configuration device 100 detects infrared reflected light from a nearby object by using the photodiode. When sufficient reflected light is detected, it may be determined that there is an object near the configuration device 100. When insufficient reflected light is detected, the configuration device 100 may determine that there is no object near the configuration device 100. The configuration device 100 may detect, by using the optical proximity sensor 180G, that the user holds the configuration device 100 close to an ear for a call, to automatically turn off a screen for power saving. The optical proximity sensor 180G may also be used in a flip cover mode or a pocket mode to automatically unlock or lock the screen.

The ambient light sensor 180L is configured to sense ambient light brightness. The configuration device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the configuration device 100 is in a pocket, to prevent an accidental touch.

The fingerprint sensor 180H is configured to collect a fingerprint. The configuration device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the configuration device 100 executes a temperature processing policy based on the temperature detected by the temperature sensor 180J. For example, when the temperature reported by the temperature sensor 180J exceeds a threshold, the configuration device 100 lowers performance of a processor located near the temperature sensor 180J, to reduce power consumption and implement thermal protection. In some other embodiments, when the temperature is less than another threshold, the configuration device 100 heats the battery 142 to prevent the configuration device 100 from being shut down abnormally due to a low temperature. In some other embodiments, when the temperature is less than still another threshold, the configuration device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the configuration device 100 at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may alternatively be disposed in a headset, to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The configuration device 100 may receive a key input, and generate a key signal input related to a user setting and function control of the configuration device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the configuration device 100. The configuration device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 may also be compatible with different types of SIM cards. The SIM card interface 195 may also be compatible with an external storage card. The configuration device 100 interacts with a network through the SIM card, to implement functions such as calling and data communication. In some embodiments, the configuration device 100 uses an eSIM, that is, an embedded SIM card. The eSIM card may be embedded in the configuration device 100, and cannot be separated from the configuration device 100.

It may be understood that the structure shown in the embodiments of this application does not constitute a specific limitation on the configuration device 100. In some other embodiments of this application, the configuration device 100 may include more or fewer components than those shown in the figure, or some components may be combined, or some components may be split, or different component arrangements may be used. The components shown in the figure may be implemented by hardware, software, or a combination of software and hardware.

In some embodiments of this application, the wireless communications module 160 may scan and access the wireless network, and obtain the network name of the accessed wireless network or the network information of the wireless network around the configuration device 100. The wireless communications module 160 or the mobile communications module 150 may be further configured to perform positioning, to determine the geographical location information when the configuration device 100 accesses the wireless network. The internal memory 121 may store the correspondence between a network name of a wireless network accessed by the configuration device 100 and a geographical location, or store the network information that is of the surrounding wireless network and that is obtained by the configuration device 100 through scanning after the configuration device 100 accesses the wireless network. The processor 110 may determine, based on the correspondence between a network name of an accessed wireless network and a geographical location, or based on the network information that is of the surrounding wireless network and that is obtained by the configuration device 100 through scanning after the configuration device 100 accesses the wireless network, that the wireless access device is replaced. Then, the processor 110 may configure the network configuration information of the old wireless access device for the new wireless access device, so that the wireless network device that previously accesses the old wireless access device may automatically access the new wireless access device based on the network configuration information of the old wireless access device.

In the following embodiments of this application, a network configuration information configuration method provided in the embodiments of this application is described by using an example in which a wireless system is a smart home system, a wireless network is a Wi-Fi network, a wireless access device is a wireless router, the wireless router includes a Wi-Fi module configured to provide a Wi-Fi network, a configuration device is a mobile phone, and another wireless network device is a smart home device in the scenario shown in FIG. 2.

In the embodiments of this application, after the mobile phone accesses a first Wi-Fi network and a first wireless router, if it is determined, based on the first Wi-Fi network and historical information stored in the mobile phone, that the mobile phone changes from accessing a second wireless router to accessing the first wireless router, network configuration information of the second wireless router is sent to the first wireless router. Then, the first wireless router configures network configuration information of the first wireless router to be consistent with the network configuration information of the second wireless router, so that the smart home device can automatically access the first wireless router used after replacement and the first Wi-Fi network based on the network configuration information of the second wireless router used before the replacement.

In some embodiments, the historical information stored in the mobile phone includes a correspondence between a Wi-Fi network and location information of the mobile phone when the mobile phone accesses the Wi-Fi network. After accessing a Wi-Fi network for the first time, the mobile phone may determine, based on the correspondence, whether a wireless router is replaced. For example, if the mobile phone determines that first location information corresponding to the first Wi-Fi network currently accessed for the first time is the same as second location information in the historical information, and a quantity of times of accessing a second Wi-Fi network corresponding to the second location information in the historical information is greater than or equal to a preset value, the mobile phone may determine that the wireless router is replaced.

Figures 1, 4A:
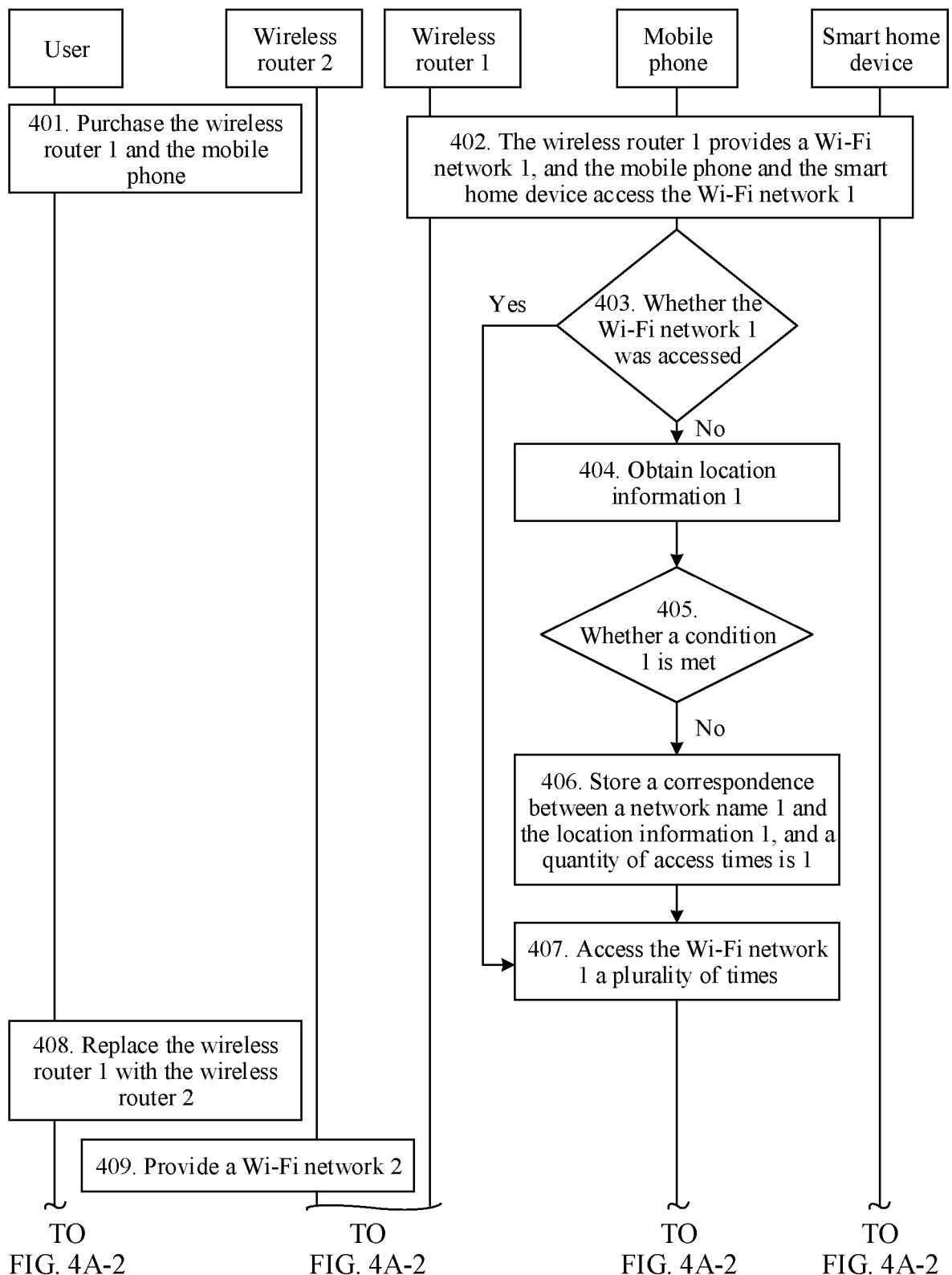
Figures 2, 4A:
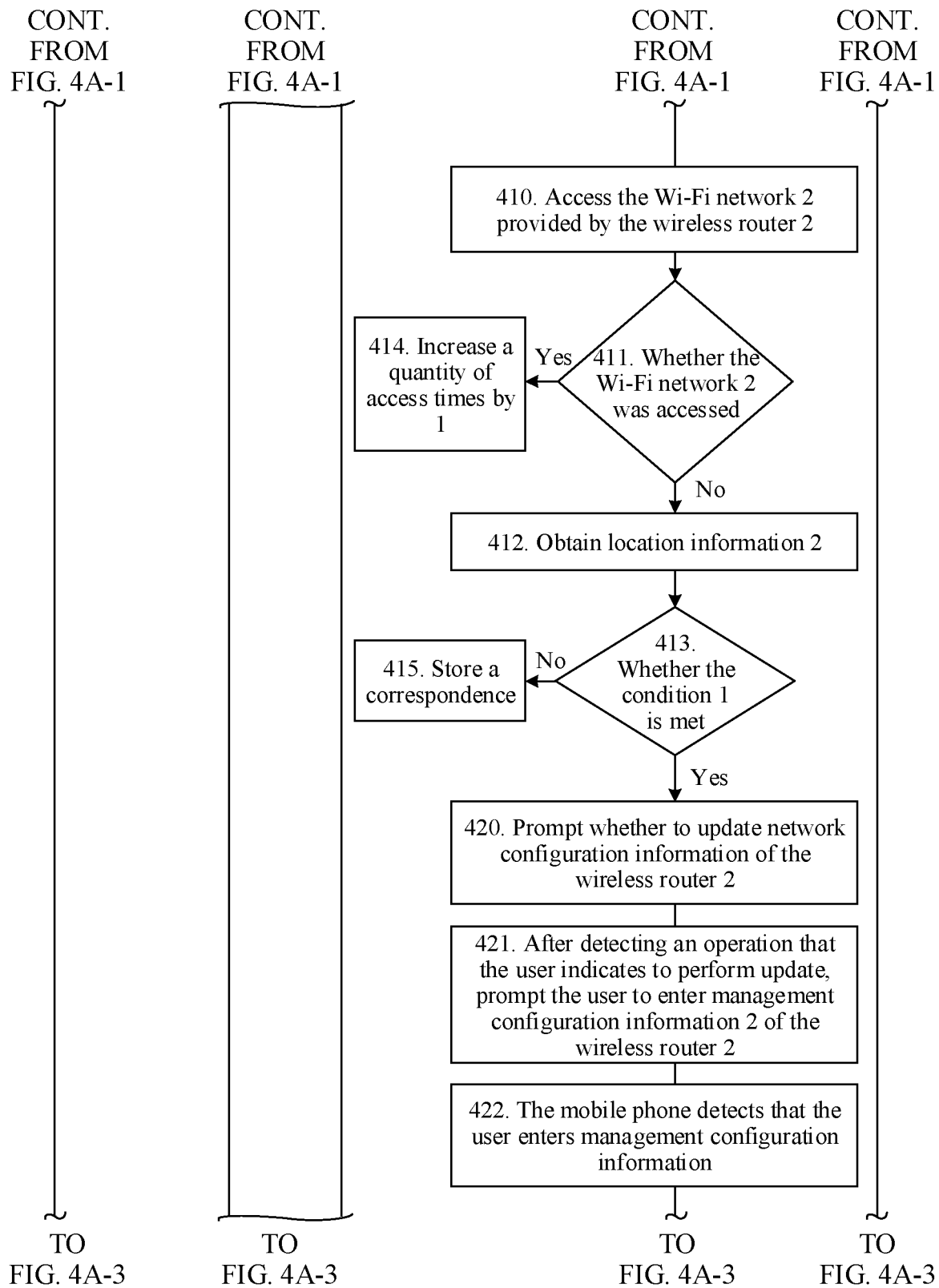
Figures 3, 4A:
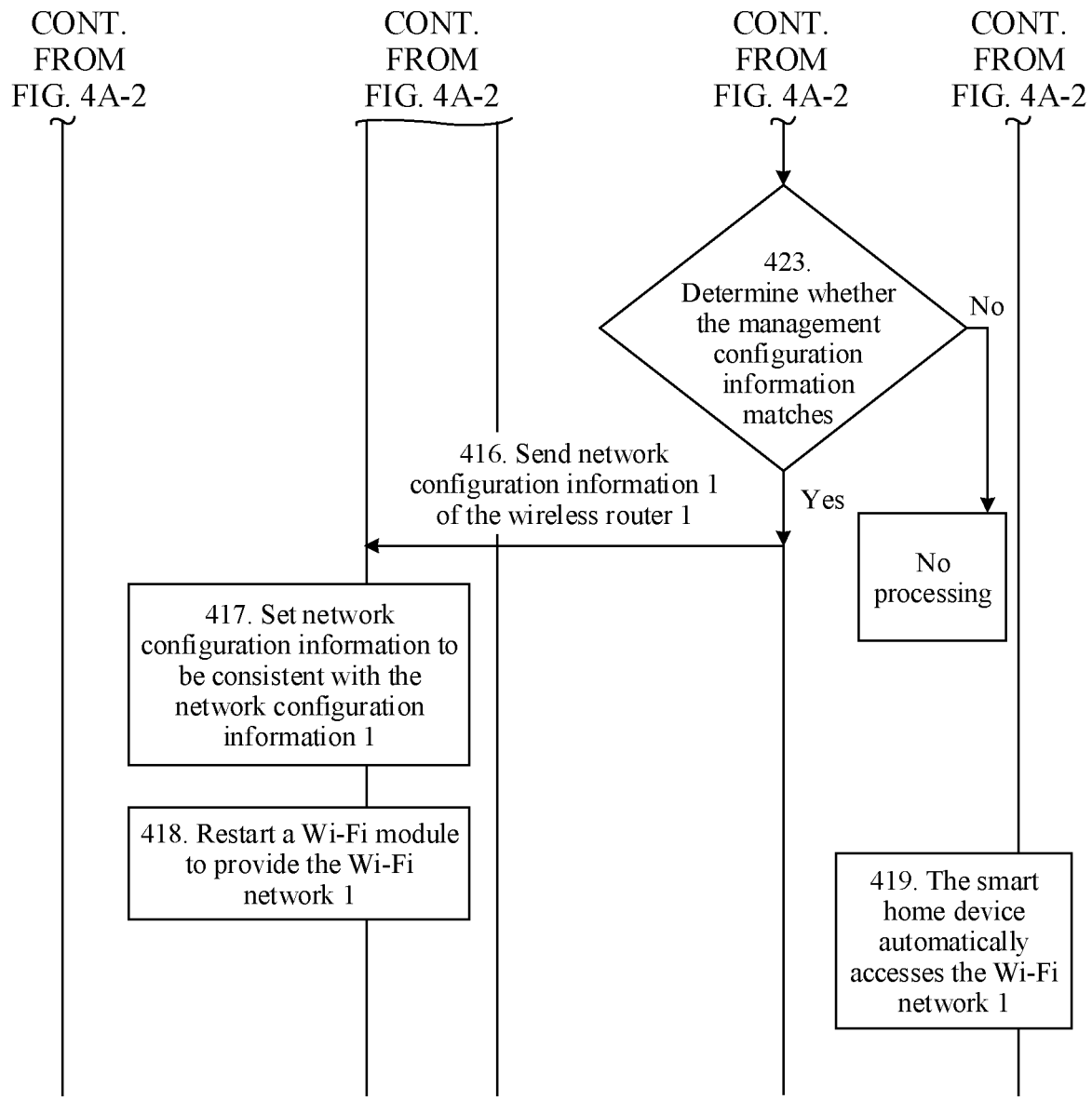

This solution is described in detail below. As shown in FIG. 4A-1 to FIG. 4A-3, the method may include the following steps.

401. A user purchases a wireless router 1 and a mobile phone.

The user purchases the wireless router 1, and the wireless router 1 may correspond to initial configuration information. For example, the initial configuration information of the wireless router 1 may be affixed to a housing by using a label (or referred to as a nameplate), or may be recorded in an instruction manual of the wireless router 1. The initial configuration information may include one or more of initial network configuration information, initial management configuration information, a management IP address, or the like. The initial network configuration information may include an initial network name and/or an initial network password of a wireless network. The initial management configuration information may include an initial administrator account and/or an initial administrator password.

402. The wireless router 1 provides a Wi-Fi network 1, the wireless router 1 and the Wi-Fi network 1 correspond to network configuration information 1, and the mobile phone and a smart home device access the Wi-Fi network 1.

The user may configure the wireless router 1 in a plurality of manners, so that the wireless router 1 can provide the Wi-Fi network 1.

For example, the initial configuration information of the wireless router 1 includes the initial network configuration information and the management IP address, but does not include the initial management configuration information. The initial network configuration information includes the initial network name of the wireless network. For example, the initial network name of the wireless network is HUA-WEI-abc. The user may log, through a browser by using a mobile phone such as a computer or the mobile phone, in to the management IP address specified by the wireless router 1. After opening an administrator interface based on the management IP address, the mobile phone may prompt the user to configure an administrator password of the wireless router 1. The user enters an administrator password 1. The mobile phone may send the administrator password 1 to the wireless router 1 for storage, and the mobile phone may also store the administrator password 1. For example, the administrator password 1 is job596.

The mobile phone may display the initial network name as a Wi-Fi network name by default on the administrator interface. The user may change the initial network name or retain the initial network name. For example, to reduce operations, the user does not enter a new network name, and the initial network name is retained as the network name.

The mobile phone may also prompt, on the administrator interface, the user to configure a wireless network password.

The user enters a network password 1. For example, the network password 1 may be 123456.

Then, the wireless router 1 restarts a Wi-Fi module, or the entire wireless router 1 is restarted to restart the Wi-Fi module.

The wireless router 1 provides the Wi-Fi network 1 after restarting the Wi-Fi module. The network configuration information 1 of the Wi-Fi network 1 includes a network name 1 and a network password 1. The network name 1 is the initial network name, that is, HUAWEI-abc. The network password 1 is 123456.

The mobile phone can search for a Wi-Fi network after a Wi-Fi function is enabled. After finding a Wi-Fi network whose network name is HUAWEI-abc, the mobile phone may prompt the user to enter the network password of the Wi-Fi network 1 if detecting an operation that the user indicates to access the Wi-Fi network 1. If the user correctly enters the network password 1, the mobile phone successfully accesses the wireless router 1 and the Wi-Fi network 1 provided by the wireless router 1.

Smart home devices such as a refrigerator and an air conditioner may access the Wi-Fi network 1 in a manner similar to that of the mobile phone. For example, the smart home device may access the Wi-Fi network 1 by using a smart home app on the mobile phone. For another example, the smart home device such as a refrigerator or an air conditioner is configured with a remote control. After detecting an operation of pressing and holding a button 1 on the remote control by the user, the smart home device enters a Wi-Fi access mode. The Wi-Fi network 1 may be found through scanning by the smart home device. After the user enters the correct network password 1 through the remote control, the smart home device can access the Wi-Fi network 1 successfully.

In addition, the mobile phone and the smart home device may further store the network configuration information 1 of the Wi-Fi network 1, so as to subsequently access the Wi-Fi network 1 again based on the network configuration information 1.

For another example, the initial configuration information of the wireless router 1 includes the initial network configuration information and the initial management configuration information. The initial network configuration information includes the initial network name and the initial network password of the wireless network. The initial management information includes the initial administrator account and the initial administrator password.

In a technical solution, the mobile phone enables a router management app. The mobile phone scans for a nearby wireless router and Wi-Fi network based on an indication of the user. If the mobile phone app prompts that the wireless router 1 and the Wi-Fi network having the initial network name are found through scanning, the mobile phone app may access the wireless router 1 based on an indication of the user. Then, the mobile phone app may prompt the user to enter the initial management configuration information of the wireless router 1. If the mobile phone determines that the user enters the correct initial administrator account and initial administrator password, the mobile phone displays a setting interface of the wireless router 1. On the setting interface, the user may retain the initial network configuration information and the initial management configuration information, or may modify the initial network configuration information and the initial management configuration information.

For example, the user modifies the initial network configuration information to the network configuration information 1, and modifies the initial management configuration information to management configuration information 1. The network configuration information 1 includes the network name 1 and the network password 1, and the management configuration information 1 includes an administrator account 1 and an administrator password 1.

Then, the wireless router 1 restarts a Wi-Fi module, or the entire wireless router 1 is restarted to restart the Wi-Fi module. The wireless router 1 provides the Wi-Fi network 1.

Then, similar to that in the foregoing method, the mobile phone and the smart home device may access the Wi-Fi network 1. Alternatively, the mobile phone may automatically access the Wi-Fi network 1 based on the network name 1 and the network password 1 that are stored in the app. In addition, the mobile phone and the smart home device may further store the network configuration information 1 of the Wi-Fi network 1, so as to subsequently access the Wi-Fi network 1 again based on the network configuration information 1.

In another technical solution, the wireless router 1 may provide the Wi-Fi network 1 based on the initial network configuration information. The mobile phone scans for a Wi-Fi network based on an indication of the user. The mobile phone prompts the user that the Wi-Fi network 1 is found through scanning. If the mobile phone detects an operation that the user indicates to access the Wi-Fi network 1, the mobile phone sends a data packet to the wireless router 1 that provides the Wi-Fi network 1.

After receiving the data packet, the wireless router 1 prompts the user (for example, turns on a Hi button on the wireless router 1 to prompt the user) if determining that the mobile phone is a device matching the wireless router 1. For example, if the wireless router and the mobile phone are devices from a same vendor, or if the wireless router and the mobile phone comply with a mutually agreed protocol, the mobile phone may determine that the wireless router 1 is a device matching the mobile phone.

Then, the wireless router 1 sends the initial network password to the mobile phone if the wireless router 1 detects an operation that the user indicates to connect to the mobile phone (for example, an operation that the user presses the Hi button). The mobile phone accesses the Wi-Fi network 1 of the wireless router 1 based on the initial network password. In this case, the network name 1 of the Wi-Fi network 1 is the initial network name, and the network password 1 of the Wi-Fi network 1 is the initial network password 1.

Then, similar to that in the foregoing method, the smart home device may access the Wi-Fi network 1. In addition, the mobile phone and the smart home device may further store the network configuration information 1 of the Wi-Fi network 1, so as to subsequently access the Wi-Fi network 1 again based on the network configuration information 1.

In the following embodiments of this application, an example in which the network configuration information 1 of the Wi-Fi network 1 includes the network name 1, the network name 1 is HUAWEI-abc, and the network password 1 is 123456 is used for description.

The wireless router 1 may correspond to the management configuration information 1, and the management configuration information 1 may be used as an authentication credential for the user to subsequently manage and modify the network configuration information 1 and the management configuration information 1 of the wireless router 1. The management configuration information 1 may be the initial management configuration information of the wireless router 1, or may be management configuration information modified by the user. In addition, as a configuration device, the mobile phone may further store the management configuration information 1. Subsequently, only after the mobile phone detects that the user enters the correct management configuration information 1, the user is allowed to modify the management configuration information 1 and the network configuration information 1 of the wireless router 1.

403. After accessing the Wi-Fi network 1, the mobile phone determines whether the mobile phone previously accesses the Wi-Fi network 1. If the mobile phone does not previously access the Wi-Fi network 1, the mobile phone performs step 404. If the mobile phone previously accesses the Wi-Fi network 1, the mobile phone performs step 407.

After accessing a Wi-Fi network each time, the mobile phone may record a network name of the accessed Wi-Fi network. If the mobile phone previously stores a network name of the Wi-Fi network 1, the mobile phone determines that the mobile phone previously accesses the Wi-Fi network 1. If the mobile phone does not previously store a network name of the Wi-Fi network 1, the mobile phone determines that the mobile phone does not previously access the Wi-Fi network 1.

Because the wireless router 1 is a device just purchased by the user, the mobile phone does not previously access the Wi-Fi network 1 provided by the wireless router 1. Therefore, step 404 may be performed.

404. The mobile phone obtains location information 1 of a location of the mobile phone by using a positioning technology. Then, the mobile phone performs step 405.

If the mobile phone does not previously access the Wi-Fi network 1, after accessing the Wi-Fi network 1, the mobile phone may obtain the location information 1 of the location of the mobile phone. For example, the positioning technology may include a GPS positioning technology, a BeiDou positioning technology, a base station positioning technology, a Wi-Fi positioning technology, a Bluetooth positioning technology, or the like. The location information 1 may be a coordinate location, or may be a geographical location name, or may be other information. This is not limited in the embodiments of this application.

In an example of a smart home system, the wireless router 1 is located in a home of the user, and the mobile phone accesses the Wi-Fi network 1 a plurality of times when the mobile phone is at home or near the home. The location information 1 stored when the mobile phone accesses the Wi-Fi network 1 is location information of the home. For example, the location information 1 may be 34°11'45.07"N and 108°50'3.77"E, or the location information 1 may be Building 3, Yangguang Community, Xi'an.

405. The mobile phone determines whether a condition 1 is met, where the condition 1 includes that corresponding location information obtained when the mobile phone accesses the current Wi-Fi network is the same as previously stored location information a, and a quantity of times of accessing a Wi-Fi network a corresponding to the previously stored location information a is greater than or equal to a preset value N.

The Wi-Fi network a is a Wi-Fi network in historical information stored by the mobile phone, and the location information a is location information that is corresponding to the Wi-Fi network a and that is in the historical information stored by the mobile phone.

Because the mobile phone is a mobile phone newly purchased by the user, and does not previously access a Wi-Fi network, the mobile phone does not store a correspondence among location information, a Wi-Fi network, and a quantity of access times. Therefore, the mobile phone determines that the condition 1 is not met. Then, the mobile phone performs step 406.

406. The mobile phone stores a correspondence between the network name 1 of the Wi-Fi network 1 and the location information 1 of the location of the mobile phone, and stores a quantity of times of accessing the Wi-Fi network 1 as 1. Then, the mobile phone performs step 407.

When the mobile phone accesses the Wi-Fi network 1, the mobile phone is usually located near the wireless router 1. In other words, the mobile phone can access the Wi-Fi network 1 only when the mobile phone is near the wireless router 1. That is, a location of the wireless router 1 is near the location indicated by the location information 1.

If the mobile phone does not previously access the Wi-Fi network 1 and the condition 1 is not met, the mobile phone may store the correspondence between the network name 1 of the Wi-Fi network 1 and the location information 1 of the location of the mobile phone, and record the quantity of access times, so that the mobile phone may subsequently determine, based on stored information, that the mobile phone accessed the Wi-Fi network 1.

If the mobile phone previously accesses the Wi-Fi network 1, the mobile phone may increase the quantity of access times by 1 after accessing the Wi-Fi network 1 again. In this way, after accessing another Wi-Fi network subsequently, it may be determined, based on the quantity of times, whether the wireless router is replaced.

For example, if the mobile phone previously accesses the Wi-Fi network 1, the mobile phone may increase the quantity of times of accessing the Wi-Fi network 1 by 1 each time the mobile phone accesses the Wi-Fi network 1 again subsequently. For another example, if the mobile phone previously accesses the Wi-Fi network 1, the mobile phone may increase the quantity of access times by 1 after the mobile phone subsequently accesses the Wi-Fi network 1 again and total duration of using the Wi-Fi network 1 is greater than m minutes. For still another example, if the mobile phone previously accesses the Wi-Fi network 1, the mobile phone may increase the quantity of access times by 1 after the mobile phone subsequently accesses the Wi-Fi network 1 again and total duration of using the Wi-Fi network 1 by the mobile phone on a day of the access is greater than m minutes.

407. The mobile phone accesses the Wi-Fi network 1 a plurality of times.

After accessing the Wi-Fi network 1 for the first time, the mobile phone may further access the Wi-Fi network 1 a plurality of times, and correspondingly record a quantity of access times. If the mobile phone further accesses, in another place, a Wi-Fi network 0 provided by another wireless router (for example, a Wi-Fi network that is set in an office), the mobile phone may also store a network name 0 of the accessed Wi-Fi network 0, location information 0 of a location in which the mobile phone accesses the Wi-Fi network 0, and a quantity of access times.

For example, for a correspondence among a network name that is of a Wi-Fi network and that is stored by the mobile phone, location information obtained when the mobile phone accesses the Wi-Fi network, and a quantity of access times, refer to Table 1.

TABLE 1

| Wi-Fi network | Location information | Quantity of access times |
|---|---|---|
| Network name 0: office | Location information 0 | n = 6 |
| Network name 1: HUAWEI-abc | Location information 1 | n = 35 |
| ... | ... | ... |

408. The user replaces the wireless router 1 with a wireless router 2.

The user may replace the wireless router 1 with the wireless router 2 if the user does not want to continue using the wireless router 1 due to damage of the wireless router 1, poor performance such as a low communication speed of the wireless router 1, or another reason.

409. The wireless router 2 provides a Wi-Fi network 2, and the wireless router 2 and the Wi-Fi network 2 correspond to network configuration information 2.

410. The mobile phone accesses the Wi-Fi network 2 provided by the wireless router 2.

Similar to that in the manner described in step 402, the mobile phone may access, in a plurality of manners, for example, by using a management IP address specified by the wireless router 2, by using a router management app, or by using a Hi button on the wireless router 2, the Wi-Fi network 2 provided by the wireless router 2. The mobile phone may obtain and store the network configuration information 2 of the Wi-Fi network 2. The network configuration information 2 of the Wi-Fi network 2 may include a network name 2 and a network password 2.

The network name 2 and the network password 2 may be an initial network name and an initial network password that are corresponding to the wireless router 2, or may be a network name and a network password obtained after the user modifies the initial network name or the initial network password. This is not limited in the embodiments of this application. For example, the network name 2 of the Wi-Fi network 2 is HUAWEI-xyz, and the network password 2 is 654321.

In some embodiments, in a process in which the mobile phone accesses the Wi-Fi network 2 provided by the wireless router 2, the user may further enter management configuration information 2 of the wireless router 2, and the mobile phone may further store the management configuration information 2. For example, the management configuration information 2 may include an administrator account 2 and an administrator password 2. The management configuration information 2 is used as an authentication credential for subsequently managing and modifying the network configuration information 2 and the management configuration information 2. For example, the administrator account 2 may be John, and the administrator password 2 may be qwerty. Subsequently, only after the mobile phone detects that the user enters the correct management configuration information 2, the user is allowed to modify the management configuration information 2 and the network configuration information 2 of the wireless router 2.

Network names of Wi-Fi networks provided by different wireless routers are usually different. That is, the network name 2 of the Wi-Fi network 2 provided by the wireless router 2 is usually different from the network name 1 of the Wi-Fi network 1 provided by the wireless router 1.

For example, in some cases, to avoid performing complex operations, the user usually does not modify an initial network name of a Wi-Fi network corresponding to a wireless router, but modifies only an initial network password. Alternatively, in the foregoing Hi-button access solution, the mobile phone can access a Wi-Fi network without entering a network password by the user, and a network password of the Wi-Fi network is an initial network password. Initial network names of Wi-Fi networks corresponding to different wireless routers are different. Therefore, the network names of the Wi-Fi networks provided by the different wireless routers are different.

411. After accessing the Wi-Fi network 2, the mobile phone determines whether the mobile phone previously accesses the Wi-Fi network 2. Step 412 is performed if the mobile phone does not previously access the Wi-Fi network 2. Step 414 is performed if the mobile phone previously accesses the Wi-Fi network 2.

As described above, the mobile phone may store a network name of an accessed Wi-Fi network. The mobile phone may determine, based on whether the network name 2 of the Wi-Fi network 2 matches a network name that is of a Wi-Fi network and that is in the previously stored historical information, whether the mobile phone previously accesses the Wi-Fi network 2.

For example, the network name of the Wi-Fi network previously accessed by the mobile phone may be stored in the foregoing Table 1. The mobile phone may determine whether the network names recorded in Table 1 include the network name 2. If the network name 2 is included, the mobile phone may determine that the mobile phone previously accesses the Wi-Fi network 2. If the network name 2 is not included, the mobile phone may determine that the mobile phone does not previously access the Wi-Fi network 2.

Step 412 may be performed because the mobile phone currently accesses the Wi-Fi network 2 for the first time.

412. The mobile phone obtains location information 2 of a location of the mobile phone by using a positioning technology. Then, the mobile phone performs step 413.

413. The mobile phone determines whether the condition 1 is met, where the condition 1 includes that corresponding location information obtained when the mobile phone accesses the current Wi-Fi network is the same as the previously stored location information a, and the quantity of times of accessing the Wi-Fi network a corresponding to the previously stored location information a is greater than or equal to the preset value N. The mobile phone performs step 415 if the condition 1 is not met. The mobile phone performs step 416 if the condition 1 is met.

As described above, the Wi-Fi network a is a Wi-Fi network in the historical information stored by the mobile phone, and the location information a is location information that is corresponding to the Wi-Fi network a and that is in the historical information stored by the mobile phone.

A value of N may be relatively large, for example, may be 10. For example, the Wi-Fi network a is the Wi-Fi network 1, and the location information a is the location information 1. If a quantity of access times corresponding to the location information 1 and the Wi-Fi network 1 exceeds the preset value N, that is, if the mobile phone previously accesses, more than N times, the Wi-Fi network 1 at a location 1 indicated by the location information 1, it may indicate that the wireless router 1 that provides the Wi-Fi network 1 is a wireless router belonging to the user, or a wireless router that can be securely used by the user, and the user usually uses the Wi-Fi network 1 provided by the wireless router 1.

If corresponding location information obtained when the mobile phone currently accesses the Wi-Fi network 2 is also the location information 1, at the location 1 indicated by the location information 1, the mobile phone suddenly accesses the Wi-Fi network 2 this time. In other words, the network name of the Wi-Fi network accessed by the mobile phone at the location 1 changes.

Because network names of Wi-Fi networks provided by different wireless routers are usually different, the mobile phone can determine that the wireless router of the user is switched, that is, the previous wireless router 1 is replaced with the wireless router 2.

For example, if Table 1 is stored in the mobile phone, the location information 2 corresponding to the Wi-Fi network HUAWEI-xyz is consistent with the location information 1 in Table 1, and the quantity n of times of accessing another Wi-Fi network HUAWEI-abc corresponding to the location information 1 in Table 1 is greater than or equal to the preset value N, the mobile phone may determine that the wireless router is replaced. In other words, the wireless router used to provide the Wi-Fi network may be replaced when the mobile phone often accesses HUAWEI-abc at the location indicated by the location information 1, but suddenly accesses HUAWEI-xyz this time at the location indicated by the location information 1.

In some other embodiments, the condition 1 may be replaced with the following: Corresponding location information obtained when the mobile phone accesses the current Wi-Fi network is the same as the location information a in the previously stored historical information. When the mobile phone determines that the corresponding location information obtained when the mobile phone accesses the current Wi-Fi network is the same as the location information a in the previously stored historical information, it may indicate that the mobile phone previously accesses the Wi-Fi network a corresponding to the location information a at the location indicated by the location information a, but accesses another Wi-Fi network this time at the location indicated by the location information a. In this case, the wireless router used to provide the Wi-Fi network may be replaced.

414. The mobile phone increases a quantity of times of accessing the Wi-Fi network 2 by 1.

The mobile phone increases the quantity of times of accessing the Wi-Fi network 2 by 1, so that after accessing another Wi-Fi network subsequently, it may be determined, based on the quantity of times, whether the wireless router is replaced.

It may be understood that, in some other solutions, if the mobile phone previously accesses the Wi-Fi network 2, the mobile phone may increase the quantity of access times by 1 after the mobile phone subsequently accesses the Wi-Fi network 2 again and total duration of using the Wi-Fi network 2 by the mobile phone on a day of the access is greater than m minutes.

415. The mobile phone stores a correspondence between the network name 2 of the Wi-Fi network 2 and the location information 2 of the location of the mobile phone, and stores a quantity of times of accessing the Wi-Fi network 2 as 1.

If the mobile phone does not previously access the Wi-Fi network 2 and the condition 1 is not met, the mobile phone may store the correspondence between the network name 2 of the Wi-Fi network 2 and the location information 2 of the location of the mobile phone, and record the quantity of access times, so that the mobile phone may subsequently determine, based on stored information, that the mobile phone accessed the Wi-Fi network 2.

416. The mobile phone sends the network configuration information 1 of the wireless router 1 to the wireless router 2.

As described above, the mobile phone may store the network configuration information 1 corresponding to the wireless router 1 and the Wi-Fi network 1 after accessing the Wi-Fi network 1. The mobile phone may obtain a communication address (for example, a MAC address) of the wireless router 2 after accessing the Wi-Fi network 2. The mobile phone may send the network configuration information 1 that is of the wireless router 1 and that is stored by the mobile phone to the wireless router 2 based on the communication address of the wireless router 2 after determining that the condition 1 is met.

417. The wireless router 2 sets the network configuration information to be consistent with the network configuration information 1.

The wireless router 2 may set the network configuration information 2 corresponding to the wireless router 2 to be consistent with the network configuration information 1 after receiving the network configuration information 1 sent by the mobile phone.

418. The wireless router 2 restarts a Wi-Fi module and provides the Wi-Fi network 1 based on the network configuration information 1.

The wireless router 2 may restart only the Wi-Fi module, or the entire wireless router 2 may be restarted to restart the Wi-Fi module. The wireless router 2 provides the Wi-Fi network 1, and corresponding network configuration information is the network configuration information 1.

419. The smart home device automatically accesses, based on the network configuration information 1, the Wi-Fi network 1 provided by the wireless router 2.

Figure 4B:
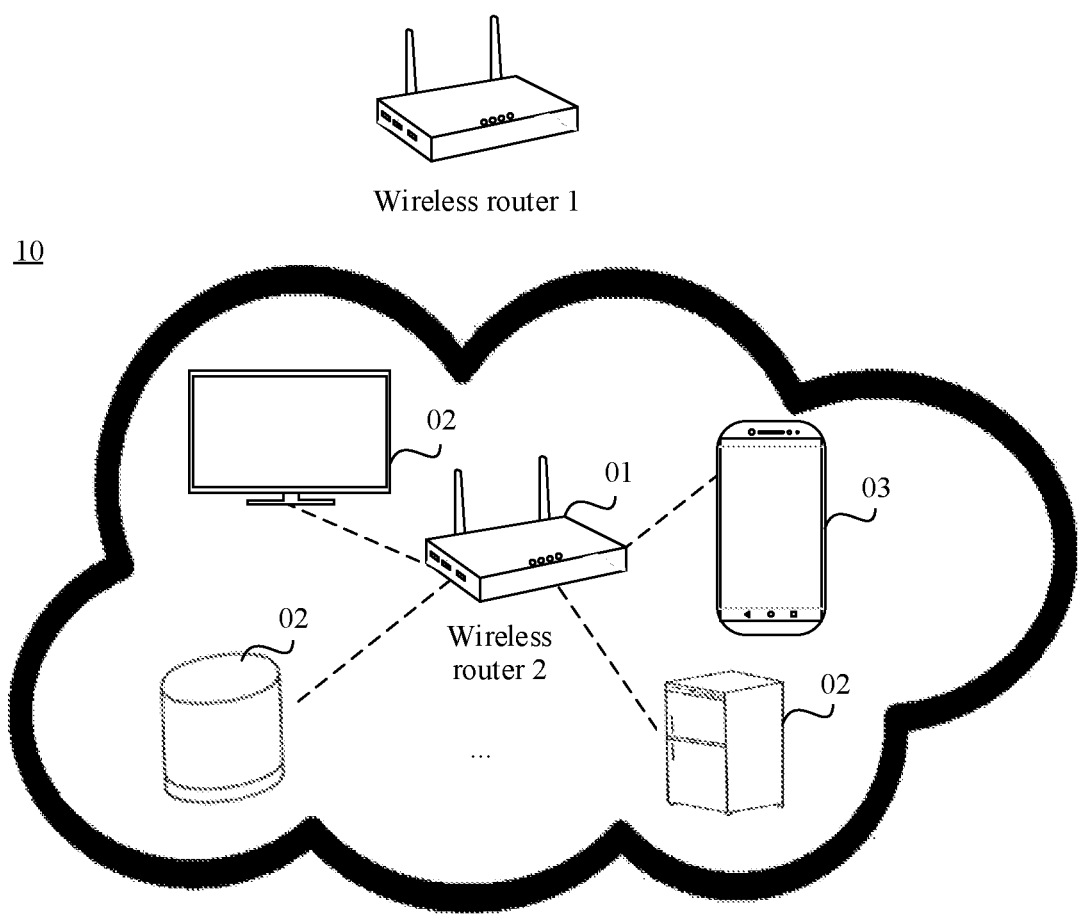
FIG. 4B is a schematic diagram of an effect after a wireless router is replaced according to an embodiment of this application.

The smart home device stores the network configuration information 1 of the Wi-Fi network 1 after previously accessing the Wi-Fi network provided by the wireless router 1. After the wireless router 2 provides the Wi-Fi network 1 based on the network configuration information 1, the smart home device may scan the Wi-Fi network 1 provided by the wireless router 2 to automatically access, based on the previously stored network configuration information 1, the Wi-Fi network 1 provided by the wireless router 2, so that the user does not need to separately perform a manual access operation for each smart home device. For example, for a schematic diagram of a smart home scenario existing after the wireless router is replaced, refer to FIG. 4B.

In this way, when the wireless router is replaced, the user does not need to separately perform a manual setting on the smart home device, and does not need to perform a configuration operation on both a new wireless router and an old wireless router. The mobile phone serving as the configuration device may automatically determine, based on a correspondence between a network identifier and location information, that the wireless router is replaced, and provide network configuration information of the old wireless router for the new wireless router. The new wireless router may set network configuration information of the new wireless router to be consistent with the network configuration information of the old wireless router, so that another wireless network device such as the smart home device can automatically access, based on the network configuration information of the old wireless router, a Wi-Fi network provided by the new wireless router.

In addition, it should be noted that the network configuration information 1 provided by the mobile phone for the wireless router 2 may further include some related information other than the network name and the network password. For example, the network configuration information 1 may further include information such as a data encryption manner, a media access control address (media access control address, MAC) filtering rule, an AP isolation policy, a PMF enabling status, or an SSID configuration rule. The mobile phone provides the network configuration information 1 for the wireless router 2 for update and configuration, so that consistency of user configurations on the wireless router 2 and the wireless router 1 can be maintained. In this way, the user can normally use the wireless router 2 based on previous settings on the wireless router 1. This conforms to a usage habit of the user and prevents the user from performing related configuration again.

In some embodiments, before the mobile phone sends the network configuration information 1 of the wireless router 1 to the wireless router 2, the mobile phone may further prompt the user whether to configure the network configuration information of the old wireless router to the new wireless router. The mobile phone may further perform authentication on an identity of the user after detecting an operation that the user indicates to perform configuration.

Specifically, before step 416 and after step 413, the method may further include the following steps.

420. The mobile phone prompts the user whether to update the network configuration information of the wireless router 2.

The mobile phone may prompt, in a plurality of manners, for example, by using an interface display prompt, a voice prompt, a vibration prompt, or an indicator prompt, the user whether to update the network configuration information of the wireless router 2, so as to update the network configuration information 2 corresponding to the wireless router 2 to the network configuration information 1 corresponding to the wireless router 1.

Figures 5A, 5B:
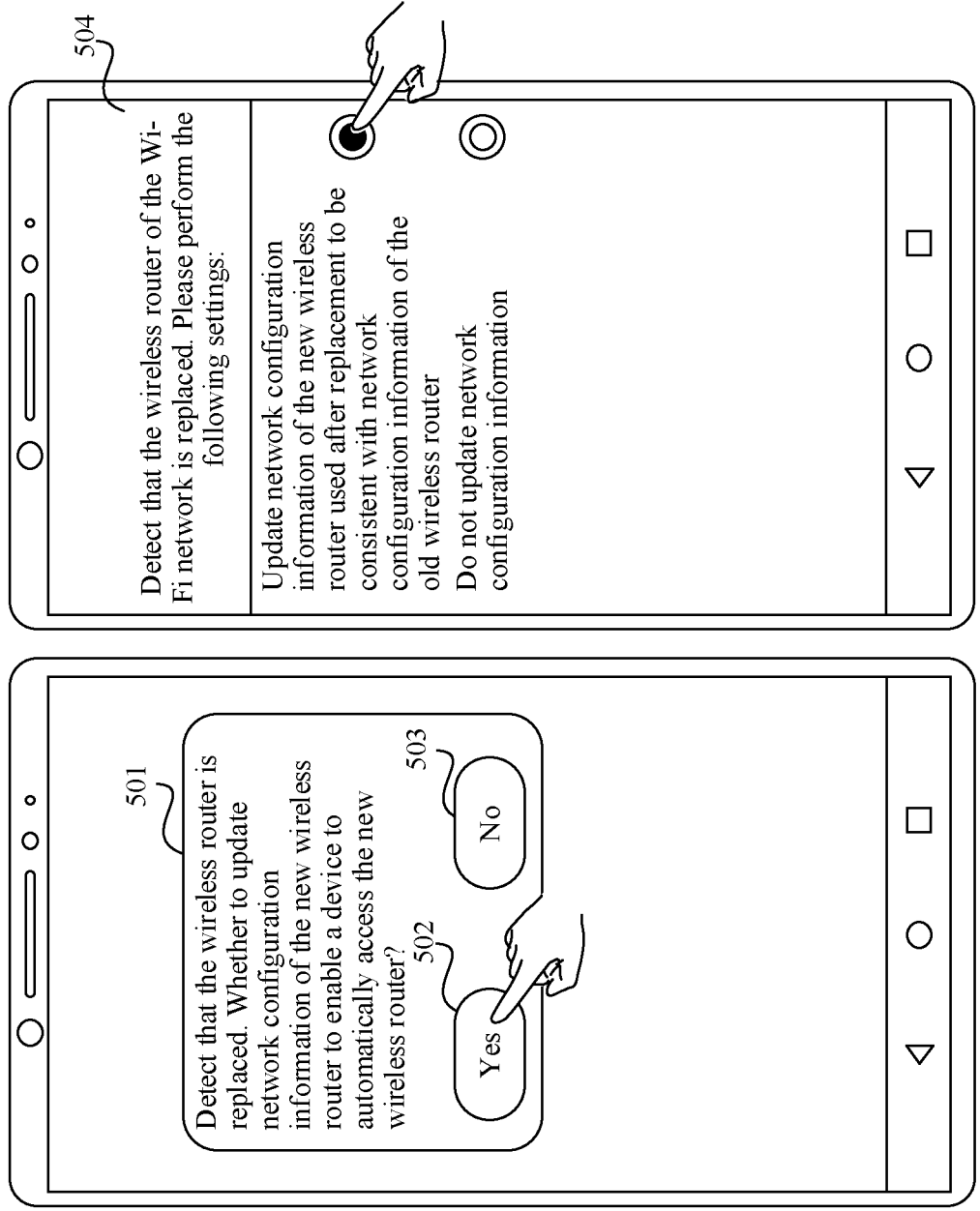
FIG. 5A to FIG. 5D are a schematic diagram of a group of interfaces according to an embodiment of this application.

For example, as shown in FIG. 5A, the mobile phone may prompt, by using a prompt box 501, the user that replacement of the wireless router is detected, and ask the user whether to update the network configuration information of the wireless router 2. For another example, as shown in FIG. 5B, the mobile phone may perform prompting by using a prompt interface 504.

421. After detecting an operation that the user indicates to perform update, the mobile phone prompts the user to enter the management configuration information 2 of the wireless router 2.

After detecting the operation that the user indicates to perform update, for example, after detecting an operation that the user taps a control 502, the mobile phone may prompt the user to enter the management configuration information 2 of the to-be-updated wireless router 2, so as to perform authentication on an identity of the user. This improves security of an information configuration process. The mobile phone can send the network configuration information 1 corresponding to the wireless router 1 to the wireless router 2 for update only after the authentication on the identity of the user succeeds.

If the user does not replace the wireless router, or the user determines that the user does not want to update the network configuration information of the wireless router 2, the mobile phone may be indicated not to perform update. For example, the user may tap a control 503 to indicate not to perform update.

422. The mobile phone detects that the user enters management configuration information.

423. The mobile phone determines whether the management configuration information entered by the user matches the management configuration information 2 of the wireless router 2.

If the mobile phone determines that the management configuration information entered by the user matches the management configuration information 2 of the wireless router 2, the mobile phone determines that the management configuration information entered by the user is correct, and determines that the authentication on the identity of the user succeeds, so that step 416 may be performed. To be specific, the network configuration information 1 corresponding to the wireless router 1 is sent to the wireless router 2 for update. If the mobile phone determines that the management configuration information entered by the user does not match the management configuration information 2 of the wireless router 2, the mobile phone does not perform processing. Therefore, step 416 is not performed, and the network configuration information of the wireless router 2 is not updated.

In some embodiments, the mobile phone previously stores the management configuration information 2 of the wireless router 2. Therefore, the mobile phone may determine whether the management configuration information entered by the user matches the management configuration information 2 stored by the mobile phone. For example, in a process of accessing the Wi-Fi network 2, the mobile phone may store the management configuration information 2 entered by the user. Alternatively, after accessing the Wi-Fi network 2, the mobile phone may obtain the management configuration information 2 from the management configuration information. In some other embodiments, the mobile phone does not previously store the management configuration information 2 of the wireless router 2, and the mobile phone may send the management configuration information entered by the user to the wireless router 2 for authentication and obtain an authentication result returned by the wireless router 1.

In some other embodiments, the management configuration information 2 of the wireless router 2 may alternatively be in a form other than the administrator account and/or the administrator password. For example, the management configuration information 2 may be other biometric feature information such as fingerprint information or iris information that is previously set by the user.

In some other embodiments, after step 417, the wireless router 2 may further prompt, by using a voice, an indicator, a vibration, display information, or the like, the user that the network configuration information has been updated to the network configuration information of the old wireless router.

Figures 5C, 5D:
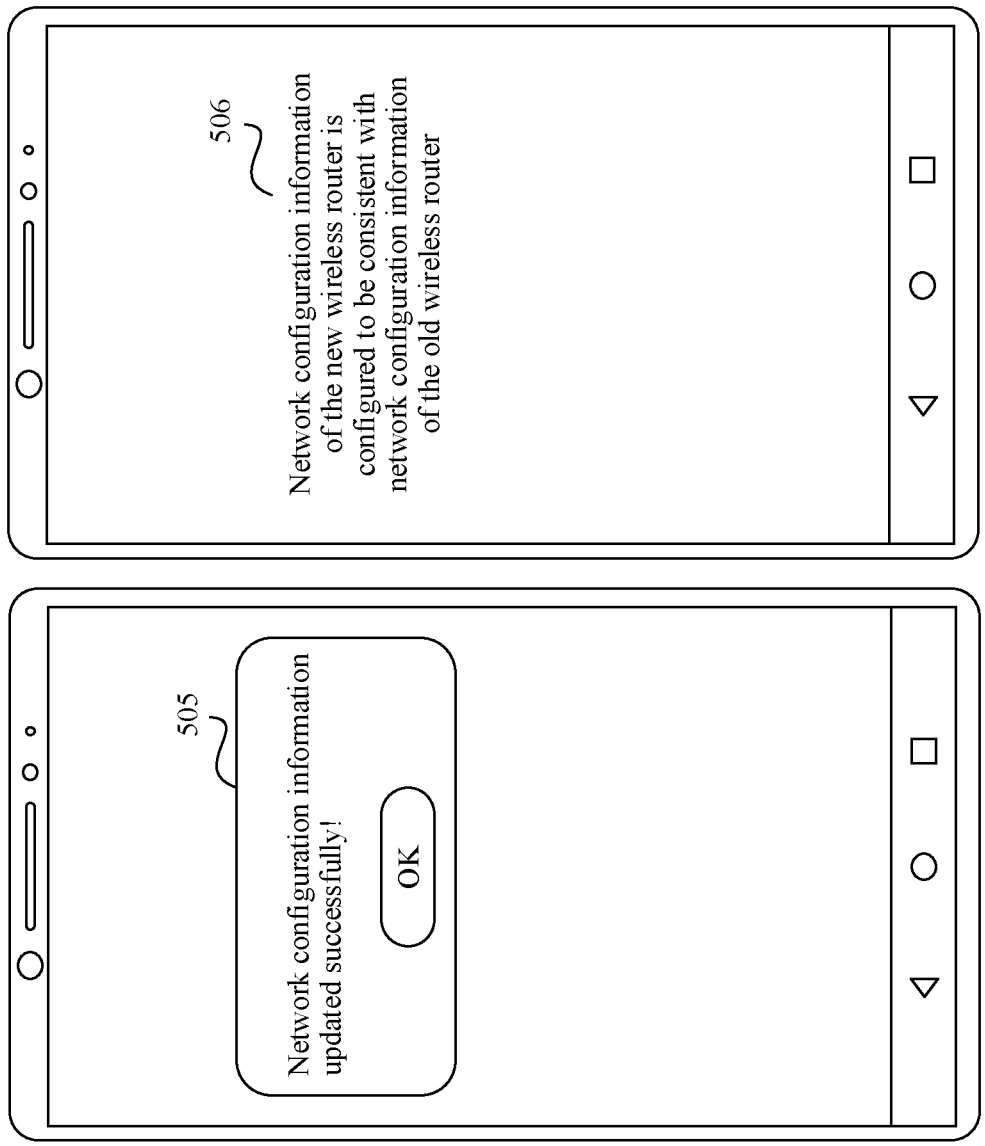

In some other embodiments, after step 417, the wireless router 2 may notify the mobile phone that the network configuration information has been updated. Then, the mobile phone may prompt, by using display information, a voice, an indicator, or a vibration, the user that the new wireless router has updated the network configuration information to the network configuration information of the old wireless router. For example, as shown in FIG. 5C, the mobile phone may prompt the user by using a prompt box 505. For another example, as shown in FIG. 5D, the mobile phone may prompt the user by using prompt information 506.

In the historical information previously stored in the mobile phone, quantities of access times corresponding to a plurality of Wi-Fi networks a at a location at which the mobile phone currently accesses the Wi-Fi network may be greater than or equal to the preset value N. For example, the user may have a plurality of wireless routers at home. The plurality of wireless routers may provide a plurality of Wi-Fi networks, and a quantity of times that the mobile phone separately accesses each Wi-Fi network at home is greater than or equal to N. For example, the mobile phone accesses the Wi-Fi network 2 at home this time, and both a quantity of times that the mobile phone previously accesses the Wi-Fi network 0 at home and a quantity of times that the mobile phone previously accesses the Wi-Fi network 1 at home are greater than or equal to N.

For this case, the mobile phone may further prompt the user to select a target Wi-Fi network in step 420. Alternatively, the mobile phone may determine a Wi-Fi network that the mobile phone accesses the most frequently at home in the plurality of Wi-Fi networks as a target Wi-Fi network. Alternatively, the mobile phone may randomly select one of the plurality of Wi-Fi networks as a target Wi-Fi network. Then, in step 416, the mobile phone may provide network configuration information corresponding to a wireless router of the target Wi-Fi network for the wireless router 2 for configuration.

In some other embodiments, in different time periods, the user and the mobile phone are usually located in different geographical locations, and Wi-Fi networks provided by different wireless routers may be accessed at the different geographical locations. For example, a time period 1 includes working hours from Monday to Friday. In the time period 1, the mobile phone usually accesses a Wi-Fi network provided by a wireless router in an office room. For another example, a time period 2 includes evenings from Monday to Friday and weekends. In the time period 2, the mobile phone usually accesses a Wi-Fi network provided by a wireless router at home. That is, in different time periods, the mobile phone usually accesses Wi-Fi networks provided by different wireless routers. Therefore, the location information in the configuration process shown in FIG. 4A-1 to FIG. 4A-3 may be replaced with access time period information, and the mobile phone may determine, based on a correspondence among a network name, time period information, and a quantity of access times, whether the wireless router is replaced.

For example, for the correspondence among a network name stored by the mobile phone, time period information, and a quantity of access times, refer to Table 2.

TABLE 2

| Wi-Fi network | Time period | Quantity of access times |
|---|---|---|
| Network name 0: office | Time period 1 | n = 13 |
| Network name 1: HUAWEI-abc | Time period 2 | n = 28 |
| . . . | . . . | . . . |

If the mobile phone currently accesses HUAWEI-xyz, a corresponding time period is the time period 2, and the quantity n of times of accessing another Wi-Fi network HUAWEI-abc corresponding to the time period 2 in Table 2 is greater than the preset value N, the mobile phone may determine that the wireless router is replaced. To be specific, the wireless router may be replaced when the mobile phone usually accesses HUAWEI-abc in the time period 2, but suddenly accesses HUAWEI-xyz this time in the time period 2.

In some cases, for ease of use, memory, or search, the user may set network names of Wi-Fi networks of different wireless routers to a same network name. For example, network names of Wi-Fi networks provided by the wireless router 1 and the wireless router 2 are both myhome. In this case, in a scenario in which the wireless router is replaced, because neither the network name of the Wi-Fi network accessed by the mobile phone nor the location information changes, the mobile phone cannot determine that the wireless router is replaced.

For this case, in some other embodiments of this application, after accessing the Wi-Fi network, the mobile phone may obtain a device identifier of the wireless router corresponding to the Wi-Fi network. The mobile phone may store a correspondence among a network name of an accessed Wi-Fi network, a device identifier of a corresponding wireless router, location information, and a quantity of access times. For example, the device identifier of the wireless router may include a MAC address, a serial number, or the like of the wireless router.

In this way, if the mobile phone determines that the device identifier of the wireless router of the same Wi-Fi network that is successfully accessed at the same location suddenly changes this time, it may indicate that the wireless router is replaced. Therefore, the mobile phone may provide the network configuration information of the old wireless router for the new wireless router, so that the new wireless router updates settings. In this way, another wireless network device may automatically access, based on the network configuration information of the old wireless router, the Wi-Fi network provided by the new wireless router.

In some other cases, if the wireless router 1 is restored to factory settings, the network configuration information such as the network password of the wireless router 1 after restoration to the factory settings is usually different from the network configuration information before restoration to the factory settings. In this case, the smart home device previously accesses the wireless router 1 existing before restoration to the factory settings cannot automatically access the wireless router 1 existing after restoration to the factory settings.

When the wireless router is restored to factory settings, the device identifier of the wireless router does not change. In addition, it can be learned from the foregoing descriptions that, to simplify operations, the user usually does not change the network name of the Wi-Fi network of the wireless router. To be specific, network names of the Wi-Fi network before and after restoration to the factory settings are usually the same. In this case, because none of the network name of the Wi-Fi network accessed by the mobile phone, the device identifier of the wireless router, and the location information changes, the mobile phone cannot determine that the wireless router is replaced.

However, to improve security of the Wi-Fi network, the user usually modifies the initial network password of the Wi-Fi network of the wireless router. To be specific, network passwords of the Wi-Fi network before and after restoration to the factory settings are usually different. For this case, in some other embodiments of this application, the mobile phone may not only store the network name of the accessed Wi-Fi network, the location information, and the quantity of times, but also store the network password of the accessed Wi-Fi network.

In this way, if the mobile phone determines that the network password of the same Wi-Fi network that is successfully accessed at the same location suddenly changes this time, it may indicate that the wireless router is replaced. Therefore, the network configuration information of the old wireless router may be provided for the new wireless router, so that the new wireless router updates settings. In this way, another wireless network device may automatically access, based on the network configuration information of the old wireless router, the Wi-Fi network provided by the new wireless router.

In some other embodiments, a correspondence among a network name and a network password that are of a Wi-Fi network, and location information may be stored in the historical information in the mobile phone. If a Wi-Fi network that the mobile phone currently accesses at a first location indicated by first location information and a Wi-Fi network accessed at the first location and stored in the historical information have a same network name but different network passwords, the mobile phone determines that a wireless router may be replaced. Therefore, the user may be prompted whether to configure network configuration information of the wireless router.

In some embodiments, the historical information stored in the mobile phone includes a correspondence between a Wi-Fi network and neighboring network information of the Wi-Fi network. After accessing a Wi-Fi network for the first time, the mobile phone may determine, based on the correspondence, whether a wireless router is replaced. For example, after the mobile phone accesses a first Wi-Fi network for the first time, if the mobile phone determines that first neighboring network information of the first Wi-Fi network matches second neighboring network information of a second Wi-Fi network in the historical information, the mobile phone may determine that the wireless router is replaced.

Figure 6A:
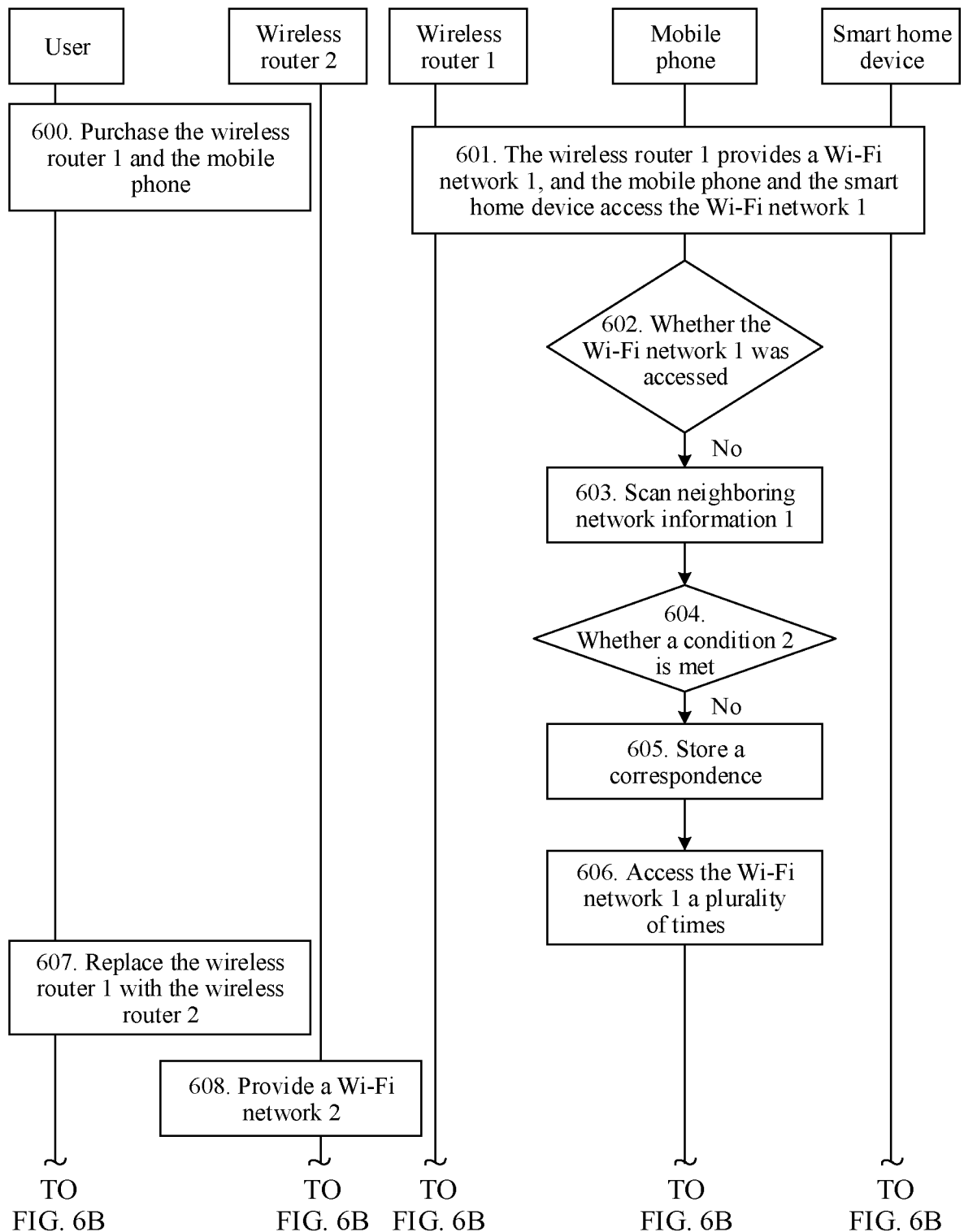
FIG. 6A and FIG. 6B are a flowchart of another network configuration information configuration method according to an embodiment of this application.
Figure 6B:
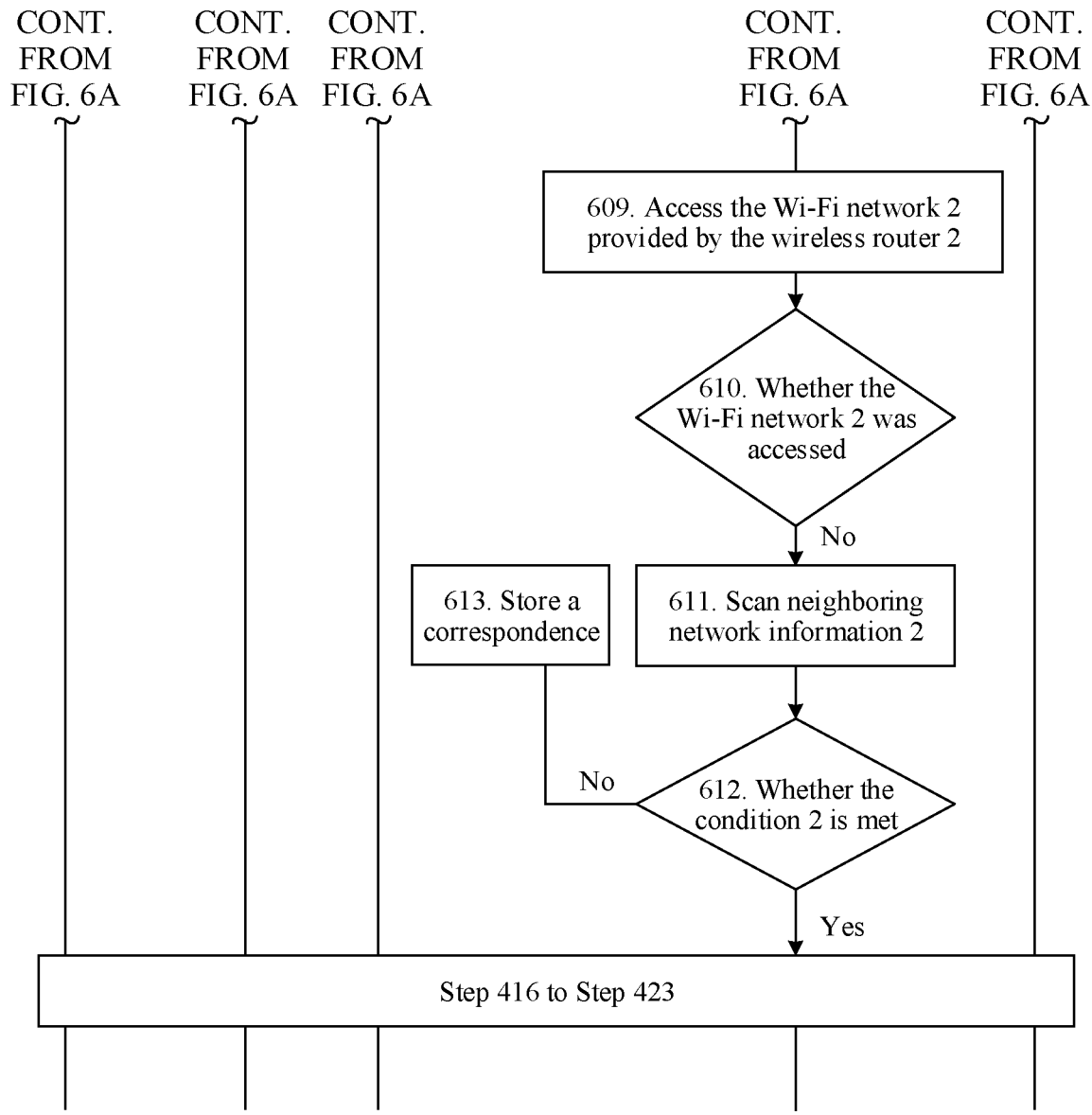

This solution is described in detail below. As shown in FIG. 6A and FIG. 6B, the method may include the following steps.

600. A user purchases a wireless router 1 and a mobile phone.

601. The wireless router 1 provides a Wi-Fi network 1, the wireless router 1 and the Wi-Fi network 1 correspond to network configuration information 1, and the mobile phone and a smart home device access the Wi-Fi network 1.

For descriptions of this step, refer to related descriptions in step 402. The mobile phone and the smart home device may store the network configuration information 1 of the Wi-Fi network 1 after accessing the Wi-Fi network 1, so as to subsequently access the Wi-Fi network 1 again based on the network configuration information 1.

602. After accessing the Wi-Fi network 1, the mobile phone determines whether the mobile phone previously accesses the Wi-Fi network 1.

The mobile phone determines that the mobile phone does not previously access the Wi-Fi network, and then step 603 may be performed.

603. The mobile phone scans neighboring network information 1 of the Wi-Fi network 1.

The neighboring network information may include network information of a nearby Wi-Fi network that can be scanned by the mobile phone, including network information of a Wi-Fi network that the mobile phone accessed and network information of a Wi-Fi network that the mobile phone did not access.

The network information may include a network name. In some embodiments, the network information may further include information such as signal strength of the nearby Wi-Fi network. The neighboring network information obtained through scanning after the mobile phone accesses the Wi-Fi network 1 is neighboring network information of the wireless router 1 that provides the Wi-Fi network 1.

The signal strength of the Wi-Fi network may be represented in a plurality of manners. For example, the signal strength of the Wi-Fi network may be represented by a value of decibel milliwatt dbm. For another example, the signal strength of the Wi-Fi network may be represented by a quantity of signal bars or a signal strength level.

604. The mobile phone determines whether a condition 2 is met, where the condition 2 includes whether neighboring network information currently accessed by the mobile phone matches neighboring network information a that is of a Wi-Fi network a and that is previously stored by the mobile phone.

The Wi-Fi network a is a Wi-Fi network in historical information stored by the mobile phone, and the neighboring network information a is neighboring network information corresponding to the Wi-Fi network a in the historical information stored by the mobile phone.

Because the newly purchased mobile phone does not previously access a Wi-Fi network, and does not previously store neighboring network information, the mobile phone determines that the condition 2 is not met. Then, the mobile phone may perform step 605.

605. The mobile phone stores a correspondence between a network name 1 and the neighboring network information 1 that are of the Wi-Fi network 1. Then, the mobile phone may perform step 606.

If the mobile phone does not previously access the Wi-Fi network 1 and the condition 2 is not met, the mobile phone may store the correspondence between the network name 1 and the neighboring network information 1 that are of the Wi-Fi network 1, so that the mobile phone may subsequently determine, based on stored information, that the mobile phone accessed the Wi-Fi network 1.

606. The mobile phone accesses the Wi-Fi network 1 and another Wi-Fi network a plurality of times.

It should be noted that, as time goes by, neighboring network information of a same Wi-Fi network may actually change slightly. To make the neighboring network information that is of the same Wi-Fi network and that is stored by the mobile phone consistent with actual information, the mobile phone may further frequently scan and update the neighboring network information after accessing the Wi-Fi network 1.

For example, the mobile phone scans and updates the neighboring network information each time the mobile phone accesses the Wi-Fi network 1. For another example, after accessing the Wi-Fi network 1, the mobile phone may further periodically scan (for example, at an interval of 1 hour) and update the neighboring network information. For another example, at a preset time point (for example, 10 p.m.) every day, if the mobile phone has accessed the Wi-Fi network 1, the mobile phone may scan and store neighboring network information.

607. The user replaces the wireless router 1 with a wireless router 2.

608. The wireless router 2 provides a Wi-Fi network 2, and the wireless router 2 and the Wi-Fi network 2 correspond to network configuration information 2.

609. The mobile phone accesses the Wi-Fi network 2 provided by the wireless router 2.

610. The mobile phone determines whether the mobile phone previously accesses the Wi-Fi network 2. If the mobile phone does not previously access the Wi-Fi network 2, the mobile phone performs step 611. If the mobile phone previously accesses the Wi-Fi network 2, the mobile phone may perform no processing.

611. The mobile phone scans neighboring network information 2 of the Wi-Fi network 2. Then, the mobile phone performs step 612.

612. The mobile phone determines whether the condition 2 is met, where the condition 2 includes whether the neighboring network information 2 matches the neighboring network information a that is of the Wi-Fi network a and that is previously stored by the mobile phone. If the condition 2 is met, the foregoing step 416 to step 423 are performed. If the condition 2 is not met, step 613 is performed.

613. The mobile phone stores a correspondence between a network name 2 and the neighboring network information 2 that are of the Wi-Fi network 2.

If the mobile phone does not previously access the Wi-Fi network 2 and the condition 2 is not met, the mobile phone may store the correspondence between the network name 2 and the neighboring network information 2 that are of the Wi-Fi network 1, so that the mobile phone may subsequently determine, based on stored information, that the mobile phone accessed the Wi-Fi network 2.

Generally, neighboring network information around a same wireless router in a same geographical location is basically unchanged or roughly unchanged. For example, neighboring network information around a wireless router in a user's home is usually network information of a Wi-Fi network in a neighbor's home, and the network information of the Wi-Fi network in the neighbor's home is basically stable and unchanged.

As described above, the Wi-Fi network a is a Wi-Fi network in the historical information stored by the mobile phone, and the neighboring network information a is neighboring network information corresponding to the Wi-Fi network a in the historical information stored by the mobile phone.

For example, the Wi-Fi network a is the Wi-Fi network 1, and the neighboring network information a is the neighboring network information 1. If the neighboring network information 2 obtained through scanning after the Wi-Fi network 2 is accessed this time matches the neighboring network information 1 that is of the Wi-Fi network 1 and that is previously stored by the mobile phone, it may indicate that the neighboring network information basically does not change, and a geographical environment in which the mobile phone is located may not change either, but the accessed Wi-Fi network changes. Therefore, the wireless router that provides the Wi-Fi network may be replaced. Then, the mobile phone may perform the foregoing step 416 to step 423 to configure, for the wireless router 2 used after the replacement, the network configuration information 1 of the wireless router 1 used before the replacement.

That the neighboring network information 2 matches the neighboring network information 1 previously stored by the mobile phone means that the neighboring network information 2 is substantially consistent with the neighboring network information 1 previously stored by the mobile phone. That is, a similarity between the neighboring network information 2 and the neighboring network information 1 is greater than or equal to a preset value.

For example, that the neighboring network information 2 matches the neighboring network information 1 previously stored by the mobile phone may include that a repetition rate between a network name of a neighboring network in the neighboring network information 2 and a network name of a neighboring network in the neighboring network information 1 is greater than or equal to a preset value 1.

For another example, in addition to the repetition rate of the network names, that the neighboring network information 2 matches the neighboring network information 1 previously stored by the mobile phone may further include that a similarity between signal strength of the neighboring network in the neighboring network information 2 and signal strength of the neighboring network in the neighboring network information 1 is greater than or equal to a preset value 2.

For example, for historical neighboring network information previously stored by the mobile phone, refer to Table 3.

For the neighboring network information 2 that is currently obtained by the mobile phone through scanning, refer to Table 4.

TABLE 3

| Network name of a Wi-Fi network accessed by a mobile phone | Neighboring network information | | |
|---|---|---|---|
| | Network name of a neighboring Wi-Fi network | Signal strength of the neighboring Wi-Fi network | |
| Network name 0: office | YY<br>Softap-xz<br>HP<br>Amnos<br>cafeteria<br>... | −35 dbm<br>−40 dbm<br>−65 dbm<br>−78 dbm<br>−80 dbm<br>... | Neighboring network information 0 |
| Network name 1: HUAWEI-abc | Delink-sjy<br>TP-link<br>CMCC<br>JYB<br>Property management<br>... | −38 dbm<br>−43 dbm<br>−57 dbm<br>−73 dbm<br>−89 dbm<br><br>... | Neighboring network information 1 |
| ... | ... | ... | |

TABLE 4

| Network name of a Wi-Fi network accessed by a mobile phone | Neighboring network information 2 | |
|---|---|---|
| | Network name of a neighboring Wi-Fi network | Signal strength of the neighboring Wi-Fi network |
| Network name 2: HUAWEI-xyz | Delink-sjy<br>TP-link<br>CMCC<br>JYB<br>Property management<br>... | −38 dbm<br>−43 dbm<br>−56 dbm<br>−73 dbm<br>−89 dbm<br>... |

It can be learned by comparing the information in Table 3 and Table 4 that the mobile phone may determine that the neighboring network information 2 is basically consistent with the neighboring network information 1 in Table 3, and the condition 2 is met. Then, the mobile phone may perform the foregoing step 416 to step 423, so as to configure the network configuration information 1 of the wireless router 1 used before the replacement as the network configuration information of the wireless router 2 used after the replacement.

In neighboring network information that is of Wi-Fi networks and that is previously stored by the mobile phone, a plurality of pieces of neighboring network information a corresponding to a plurality of Wi-Fi networks may match the neighboring network information 2 of the Wi-Fi network 2. For example, the user may have a plurality of wireless routers at home. The plurality of wireless routers may provide a plurality of Wi-Fi networks, and neighboring network information corresponding to the plurality of Wi-Fi networks is basically the same, and may all match the neighboring network information 2 of the Wi-Fi network 2. For example, neighboring network information 0 of a Wi-Fi network 0 matches the neighboring network information 2 of the Wi-Fi network 2, and the neighboring network information 1 of the Wi-Fi network 1 also matches the neighboring network information 2 of the Wi-Fi network 2.

For this case, the mobile phone may further prompt the user to select a target Wi-Fi network in step 420. Alternatively, the mobile phone may determine, as a target Wi-Fi network, a Wi-Fi network corresponding to neighboring network information that is in the plurality of pieces of neighboring network information a and that best matches the neighboring network information 2. Alternatively, the mobile phone may randomly select one of the Wi-Fi networks corresponding to the plurality of pieces of neighboring network information a as a target Wi-Fi network. Then, in step 416, the mobile phone may provide network configuration information corresponding to a wireless router of the target Wi-Fi network for the wireless router 2 for configuration.

In this way, when the wireless router is replaced, the user does not need to separately perform a manual setting on the smart home device, and does not need to perform a configuration operation on a new wireless router and an old wireless router at the same time. The mobile phone serving as a configuration device may automatically determine, based on the neighboring network information, that the wireless router is replaced, and copy network configuration information of the old wireless router to the new wireless router. The new wireless router may set network configuration information of the new wireless router to be consistent with the network configuration information of the old wireless router, so that another wireless network device such as the smart home device can automatically access, based on the network configuration information of the old wireless router, a Wi-Fi network provided by the new wireless router.

In some other embodiments, the mobile phone may store a correspondence among a network name of an accessed Wi-Fi network, neighboring network information, and a quantity of access times, so as to determine, based on these pieces of information, whether a wireless router is replaced.

For example, in step 612, if the neighboring network information 2 of the Wi-Fi network 2 matches the neighboring network information 1 that is of the Wi-Fi network 1 and that is previously stored by the mobile phone, and a quantity of times that the mobile phone accesses the Wi-Fi network 1 exceeds a preset value N, the mobile phone may more accurately determine that the wireless router 1 corresponding to the Wi-Fi network 1 is replaced with the wireless router 2 corresponding to the Wi-Fi network 2.

In some other embodiments, the mobile phone may store a correspondence among a network name of an accessed Wi-Fi network, neighboring network information, and location information, so that the mobile phone determines, based on these pieces of information, whether a wireless router is replaced.

For example, in step 612, if the neighboring network information 2 of the Wi-Fi network 2 matches the neighboring network information 1 that is of the Wi-Fi network 1 and that is previously stored by the mobile phone, and location information 2 and location information 1 obtained when the mobile phone accesses the two Wi-Fi networks are the same, the mobile phone may more accurately determine that the wireless router 1 corresponding to the Wi-Fi network 1 is replaced with the wireless router 2 corresponding to the Wi-Fi network 2.

In some other embodiments, the mobile phone may store a correspondence among a network name of an accessed Wi-Fi network, neighboring network information, location information, and a quantity of access times, so as to determine, based on these pieces of information, whether a wireless router is replaced.

For example, in step 612, if the neighboring network information 2 of the Wi-Fi network 2 matches the neighboring network information 1 that is of the Wi-Fi network 1 and that is previously stored by the mobile phone, location information 2 and location information 1 obtained when the mobile phone accesses the two Wi-Fi networks are the same, and a quantity of times that the mobile phone accesses the Wi-Fi network 1 at a location 1 indicated by the location information 1 exceeds a preset value N, the mobile phone may more accurately determine that the wireless router 1 corresponding to the Wi-Fi network 1 is replaced with the wireless router 2 corresponding to the Wi-Fi network 2.

It should be noted that, in a process of performing the configuration method provided in the foregoing embodiment, the mobile phone may interact with the user by using an interface displayed by an app, or may directly perform interface interaction with the user through support of an operating system without using an app. The app may be a native application of the operating system, or may be a third-party application.

It may be understood that the foregoing descriptions are provided by using an example in which the mobile phone is a configuration device. When the configuration device is another electronic device such as a tablet computer, the network configuration information of the wireless router may also be configured by using the method provided in the foregoing embodiment. Details are not described herein again.

In addition, the foregoing descriptions are mainly provided by using an example in which the wireless network is a Wi-Fi network. When the wireless network is another wireless network such as Bluetooth, the network configuration information of the wireless router may also be configured by using the method provided in the foregoing embodiment. Details are not described herein again.

Figure 7:
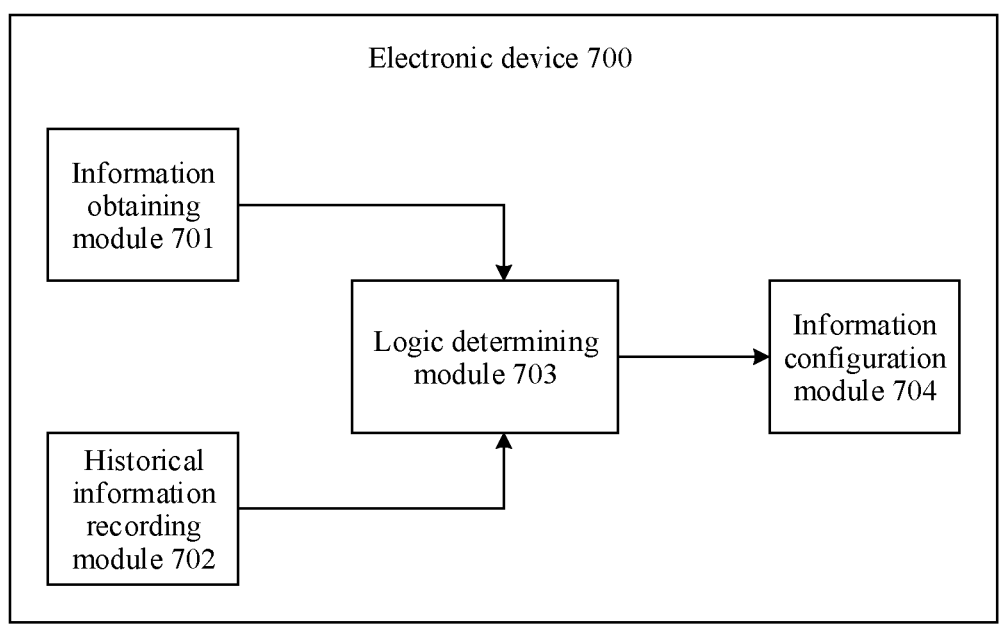
FIG. 7 is a schematic diagram of a structure of another electronic device according to an embodiment of this application.

An embodiment of this application further provides an electronic device. As shown in FIG. 7, the electronic device is the foregoing configuration device. The electronic device 700 may include an information obtaining module 701, a historical information recording module 702, a logic determining module 703, an information configuration module 704, and the like. The modules shown in FIG. 7 may cooperate with each other to implement the foregoing network configuration information configuration method.

In some embodiments, the information obtaining module may obtain related information such as location information obtained when the electronic device accesses a wireless network and network configuration information of the wireless network. The historical information recording module may record related information such as a correspondence among a network name of the wireless network accessed by the electronic device, location information during accessing, and a quantity of access times, and corresponding network configuration information. The logic determining module may determine whether the electronic device accesses a new wireless network. When the electronic device accesses a new wireless network, the logic determining module may further determine, based on the correspondence stored by the historical information recording module, whether a wireless access device is replaced. If the wireless access device is replaced, the information configuration module may provide the network configuration information that is corresponding to the wireless access device used before the replacement and that is stored by the historical information recording module for the new wireless access device used after the replacement to perform network information configuration.

For example, the information obtaining module may support the electronic device in performing step 404, step 412, and the like in the process shown in FIG. 4A-1 to FIG. 4A-3, and/or another process used in the technology described in this specification. The historical information recording module may support the electronic device in performing step 406, step 415, and the like in the process shown in FIG. 4A-1 to FIG. 4A-3, and/or another process used in the technology described in this specification. The logic determining module may support the electronic device in performing step 403, step 405, step 411, step 413, and the like in the process shown in FIG. 4A-1 to FIG. 4A-3, and/or another process used in the technology described in this specification. The information configuration module may support the electronic device in performing step 416 and the like in the process shown in FIG. 4A-1 to FIG. 4A-3, and/or another process used in the technology described in this specification.

In some other embodiments, the information obtaining module may obtain related information such as neighboring network information obtained when the electronic device accesses a wireless network and network configuration information of the wireless network. The historical information recording module may record related information such as a correspondence between a network name of the wireless network accessed by the electronic device and the neighboring network information, and corresponding network configuration information. The logic determining module may determine whether the electronic device accesses a new wireless network. When the electronic device accesses a new wireless network, the logic determining module may further determine, based on the correspondence stored by the historical information recording module, whether a wireless access device is replaced. If the wireless access device is replaced, the information configuration module may provide the network configuration information that is corresponding to the wireless access device used before the replacement and that is stored by the historical information recording module for the new wireless access device used after the replacement to perform network information configuration.

For example, the information obtaining module may support the electronic device in performing step 603, step 611, and the like in the process shown in FIG. 6A and FIG. 6B, and/or another process used in the technology described in this specification. The historical information recording module may support the electronic device in performing step 605, step 613, and the like in the process shown in FIG. 6A and FIG. 6B, and/or another process used in the technology described in this specification. The logic determining module may support the electronic device in performing step 602, step 604, step 610, step 612, and the like in the process shown in FIG. 6A and FIG. 6B, and/or another process used in the technology described in this specification. The information configuration module may support the electronic device in performing step 416 and the like in the process shown in FIG. 6A and FIG. 6B, and/or another process used in the technology described in this specification.

An embodiment of this application further provides an electronic device. The electronic device may include an access unit, a determining unit, a sending unit, an obtaining unit, a storage unit, and the like. Units in the electronic device may cooperate with each other, to implement the foregoing network configuration information configuration method.

An embodiment of this application further provides an electronic device. The electronic device includes one or more processors, a memory, and one or more computer programs. The one or more computer programs are stored in the memory, and the one or more computer programs include instructions. When the instructions are executed by the one or more processors, the electronic device is enabled to perform the steps in the foregoing embodiments, to implement the foregoing network configuration information configuration method.

An embodiment of this application further provides a computer storage medium. The computer storage medium stores computer instructions. When the computer instructions are run on an electronic device, the electronic device is enabled to perform the foregoing related method steps to implement the network configuration information configuration method in the foregoing embodiments.

An embodiment of this application further provides a computer program product. When the computer program product runs on a computer, the computer is enabled to perform the foregoing related steps to implement the network configuration information configuration method in the foregoing embodiments.

In addition, an embodiment of this application further provides an apparatus. The apparatus may be specifically a chip system. The chip system is applied to an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device performs the foregoing related steps, to implement the network configuration information configuration method in the foregoing embodiments.

In addition, an embodiment of this application further provides an apparatus. The apparatus may be specifically a component or a module. The apparatus may include a processor and a memory that are connected to each other. The memory is configured to store computer-executable instructions. When the apparatus runs, the processor may execute the computer-executable instructions stored in the memory, to enable a chip to perform the network configuration information configuration method in the foregoing method embodiments.

The electronic device, the chip, the computer storage medium, the computer program product, or the chip provided in the embodiments of this application is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for convenient and brief description, division into the foregoing function modules is used as an example for illustration. During actual application, the foregoing functions may be allocated to different function modules for implementation based on a requirement, in other words, an inner structure of an apparatus is divided into different function modules to complete all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected based on an actual requirement to achieve an objective of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   accessing a first wireless network of a first wireless access device;
   prompting a user to enter management configuration information corresponding to the first wireless access device, wherein the management configuration information comprises an administrator account or an administrator password; and
   sending, to the first wireless access device, network configuration information of a second wireless access device when the management configuration information from the user is correct and when an electronic device meets, based on the first wireless network and historical information, a preset condition,
   wherein the preset condition indicates that the electronic device has changed from accessing the second wireless access device to accessing the first wireless access device,
   wherein the network configuration information configures the first wireless access device, and
   wherein the network configuration information comprises a first network name of a second wireless network, a network password of the second wireless network.

2. The method of claim 1, further comprising: obtaining first location information when the electronic device has not previously accessed the first wireless network, wherein the first location information indicates a current location of the electronic device, and wherein the electronic device meets the preset condition further comprises that:
   the first location information is the same as second location information in the historical information; or
   the first location information is the same as the second location information and a first quantity of times of accessing a third wireless network corresponding to the second location information is greater than or equal to a preset value, wherein the third wireless network is of the second wireless access device, and wherein the first wireless network is different from the third wireless network.

3. The method of claim 2, wherein when the electronic device does not meet, based on the first location information and the historical information, the preset condition, the method further comprises:
   storing a correspondence between the first location information and the first wireless network; and
   recording a second quantity of times of accessing the first wireless network as 1.

4. The method of claim 2, further comprising increasing, in response to the electronic device having previously accessed the first wireless network, network, a second quantity of times of accessing the first wireless network by 1.

5. The method of claim 1, further comprising scanning first neighboring network information when the electronic device has not previously accessed the first wireless network, wherein the first neighboring network information is of a third wireless network around the first wireless network, wherein the electronic device further meets, based on the first neighboring network information and the historical information, the preset condition, wherein the preset condition comprises that a similarity between the first neighboring network information and second neighboring network information of a fourth wireless network in the historical information is greater than or equal to a preset value, wherein the fourth wireless network is of the second wireless access device, wherein the second neighboring network information is of a fifth wireless network around the fourth wireless network, and wherein the first wireless network is different from the fourth wireless network.

6. The method of claim 5, further comprising storing a correspondence between the first neighboring network information and the first wireless network when the electronic device does not meet, based on the first neighboring network information and the historical information, the preset condition.

7. The method of claim 6, wherein the first neighboring network information comprises a second network name of the third wireless network that is obtained by the electronic device through scanning.

8. The method of claim 1, wherein before accessing the first wireless network, the method further comprises:
   accessing a third wireless network of the second wireless access device; and
   obtaining network management configuration information of the second wireless access device, and
   wherein the management configuration information from the user is correct when the management configuration information is consistent with the network management configuration information.

9. The method of claim 1, wherein the first wireless network is a WI-FI network, and wherein the first wireless access device and the second wireless access device are wireless routers.

10. The method of claim 6, wherein the first neighboring network information comprises a second network name of the third wireless network and a network signal strength of the third wireless network that are obtained by the electronic device through scanning.

11. An electronic device, comprising:
a memory configured to store instructions; and
one or more processors coupled to the memory and configured to execute the instructions to:
   access a first wireless network of a first wireless access device;
   prompt a user to enter management configuration information corresponding to the first wireless access device, wherein the management configuration information comprises an administrator account or an administrator password; and
   send, to the first wireless access device, network configuration information of a second wireless access device when the management configuration information from the user is correct and when the electronic device meets, based on the first wireless network and historical information, a preset condition, wherein the preset condition indicates that the electronic device has changed from accessing the second wireless access device to accessing the first wireless access device,
   wherein the network configuration information configures the first wireless access device, and
   wherein the network configuration information comprises a first network name of a second wireless network, a network password of the second wireless network.

12. The electronic device of claim 11, wherein the one or more processors are further configured to obtain first location information when the electronic device has not previously accessed the first wireless network, wherein the first location information indicates a current location of the electronic device, and wherein the electronic device meets the preset condition further comprises that:
the first location information is the same as second location information in the historical information; or
the first location information is the same as the second location information and a first quantity of times of accessing a third wireless network corresponding to the second location information is greater than or equal to a preset value, wherein the third wireless network is of the second wireless access device, and wherein the first wireless network is different from the second wireless network.

13. The electronic device of claim 12, wherein when the electronic device does not meet, based on the first location information and the historical information, the preset condition, the one or more processors are further configured to execute the instructions to:
store a correspondence between the first location information and the first wireless network; and
record a second quantity of times of accessing the first wireless network as 1.

14. The electronic device of claim 12, wherein the one or more processors are further configured to execute the instructions to increase, in response to the electronic device having previously accessed the first wireless network, a second quantity of times of accessing the first wireless network by 1.

15. The electronic device of claim 11, wherein the one or more processors are further configured to execute the instructions to scan first neighboring network information when determining that the electronic device has not previously accessed the first wireless network, wherein the first neighboring network information is of a third wireless network around the first wireless network, wherein the electronic device further meets, based on the first neighboring network information and the historical information, the preset condition, wherein the preset condition comprises that a similarity between the first neighboring network information and second neighboring network information of a fourth wireless network in the historical information is greater than or equal to a preset value, wherein the fourth wireless network is of the second wireless access device, wherein the second neighboring network information is of a fifth wireless network around the fourth wireless network, and wherein the first wireless network is different from the fourth wireless network.

16. The electronic device of claim 15, wherein the one or more processors are further configured to execute the instructions to store a correspondence between the first neighboring network information and the first wireless access device when the electronic device does not meet, based on the first neighboring network information and the historical information, the preset condition.

17. The electronic device of claim 15, wherein the first neighboring network information comprises:
a second network name of the third wireless network that is obtained by the electronic device through scanning; or
the second network name and a network signal strength of the third wireless network that are obtained by the electronic device through scanning.

18. A method, comprising:
accessing a first wireless network of a first wireless access device;
obtaining first location information when an electronic device has not previously accessed the first wireless network; and
sending, to the first wireless access device, network configuration information of a second wireless access device when the electronic device meets, based on the first wireless network and historical information, a preset condition,
wherein the preset condition indicates that the electronic device has changed from accessing the second wireless access device to accessing the first wireless access device,
wherein the network configuration information configures the first wireless access device,
wherein the network configuration information comprises a first network name of a second wireless network, a network password of the second wireless network, and
wherein the electronic device meets the preset condition further comprises that:
the first location information is the same as second location information in the historical information; or
the first location information is the same as the second location information and a first quantity of times of accessing a third wireless network corresponding to the second location information is greater than or equal to a preset value, wherein the third wireless network is of the second wireless access device, and wherein the first wireless network is different from the third wireless network.

19. The method of claim 18, wherein when the electronic device does not meet, based on the first location information and the historical information, the preset condition, the method further comprises:
   storing a correspondence between the first location information and the first wireless network; and
   recording a second quantity of times of accessing the first wireless network as 1.

20. The method of claim 18, further comprising increasing, in response to the electronic device having previously accessed the first wireless network, a second quantity of times of accessing the first wireless network by 1.

* * * * *

UNITED STATES PATENT AND TRADEMARK OFFICE
CERTIFICATE OF CORRECTION

PATENT NO. : 12,184,481 B2
APPLICATION NO. : 17/639425
DATED : December 31, 2024
INVENTOR(S) : Jingwei Qu Page 1 of 1

It is certified that error appears in the above-identified patent and that said Letters Patent is hereby corrected as shown below:

In the Claims

Claim 4, Column 44, Line 28: "wireless network, network, a second" should read "wireless network, a second"

Claim 12, Column 45, Line 40: "further configure to obtain first" should read "further configure to execute the instructions to obtain first"

Signed and Sealed this
Eighteenth Day of February, 2025

Coke Morgan Stewart
*Acting Director of the United States Patent and Trademark Office*